United States Patent
Frank

(10) Patent No.: US 11,420,274 B2
(45) Date of Patent: Aug. 23, 2022

(54) MOBILE POWER TOOL

(71) Applicant: Festool GmbH, Wendlingen (DE)

(72) Inventor: Josua Frank, Urbach (DE)

(73) Assignee: Festool GmbH, Wendlingen (DE)

( * ) Notice: Subject to any disclaimer, the term of this patent is extended or adjusted under 35 U.S.C. 154(b) by 165 days.

(21) Appl. No.: 16/651,802

(22) PCT Filed: Sep. 27, 2018

(86) PCT No.: PCT/EP2018/076254
§ 371 (c)(1),
(2) Date: Mar. 27, 2020

(87) PCT Pub. No.: WO2019/063688
PCT Pub. Date: Apr. 4, 2019

(65) Prior Publication Data
US 2020/0269334 A1 Aug. 27, 2020

(30) Foreign Application Priority Data

Sep. 29, 2017 (DE) .......................... 102017122743.1
Dec. 13, 2017 (DE) .......................... 102017129813.4

(51) Int. Cl.
*B23D 59/00* (2006.01)
*B23Q 17/24* (2006.01)
*B25F 5/02* (2006.01)

(52) U.S. Cl.
CPC ....... *B23D 59/001* (2013.01); *B23Q 17/2409* (2013.01); *B25F 5/021* (2013.01)

(58) Field of Classification Search
CPC ...... B23D 59/001; B25F 5/003; B25F 5/0021; B25F 5/20; B27B 9/02; B23Q 17/2409
See application file for complete search history.

(56) References Cited

U.S. PATENT DOCUMENTS

2015/0059186 A1* 3/2015 Bermes ................ B23D 59/001
30/123
2015/0094836 A1* 4/2015 Rivers .................... B26D 5/007
700/97

(Continued)

FOREIGN PATENT DOCUMENTS

DE 102006052808 A1 5/2008
DE 102007062261 A1 6/2009

(Continued)

*Primary Examiner* — Omar Flores Sanchez
(74) *Attorney, Agent, or Firm* — Hoffmann & Baron LLP

(57) ABSTRACT

A mobile machine tool (10), namely a manually-operated machine tool (10) or semi-stationary machine tool (10), for machining a workpiece (W), wherein the machine tool (10) has a plate-like guide element (30) with a guide surface (32) for guiding the machine tool (10) on the workpiece (W) or the workpiece (W) on the machine tool (10), wherein the machine tool (10) has a drive unit (11) with a drive motor (13) for driving a tool holder (14) arranged on the drive unit (11) in order to hold a work tool (15), wherein the machine tool (10) has a tool sensor (61, 62), the detection range of which (EB1, EB2) is directed at at least a partial region of the machine tool (10), and wherein the machine tool (10) has an evaluation device (80) for evaluating a tool sensor signal generated by the tool sensor (61, 62). A reference marking (R1, R2) which can be detected by the tool sensor (61, 62) is arranged within the detection range (EB1, EB2) of the tool sensor and the evaluation device (80) is configured to determine at least one correction value for the tool sensor signal depending on the reference marking (R1, R2).

18 Claims, 10 Drawing Sheets

(56) References Cited

U.S. PATENT DOCUMENTS

| | | | | |
|---|---|---|---|---|
| 2015/0328736 A1* | 11/2015 | Klotz | ..................... | B23Q 15/14 83/13 |
| 2018/0099369 A1* | 4/2018 | Eastling | ................. | H04N 7/181 |
| 2020/0117496 A1* | 4/2020 | Strasky | ................ | B23D 59/008 |

FOREIGN PATENT DOCUMENTS

| | | |
|---|---|---|
| DE | 102008040774 A1 | 2/2010 |
| DE | 102008055058 A1 | 6/2010 |
| DE | 102009044916 A1 | 4/2011 |
| DE | 102009054709 A1 | 6/2011 |
| DE | 102014209011 A1 | 11/2015 |
| JP | 2008260121 A | 10/2008 |
| JP | 2017093654 A | 6/2017 |

* cited by examiner

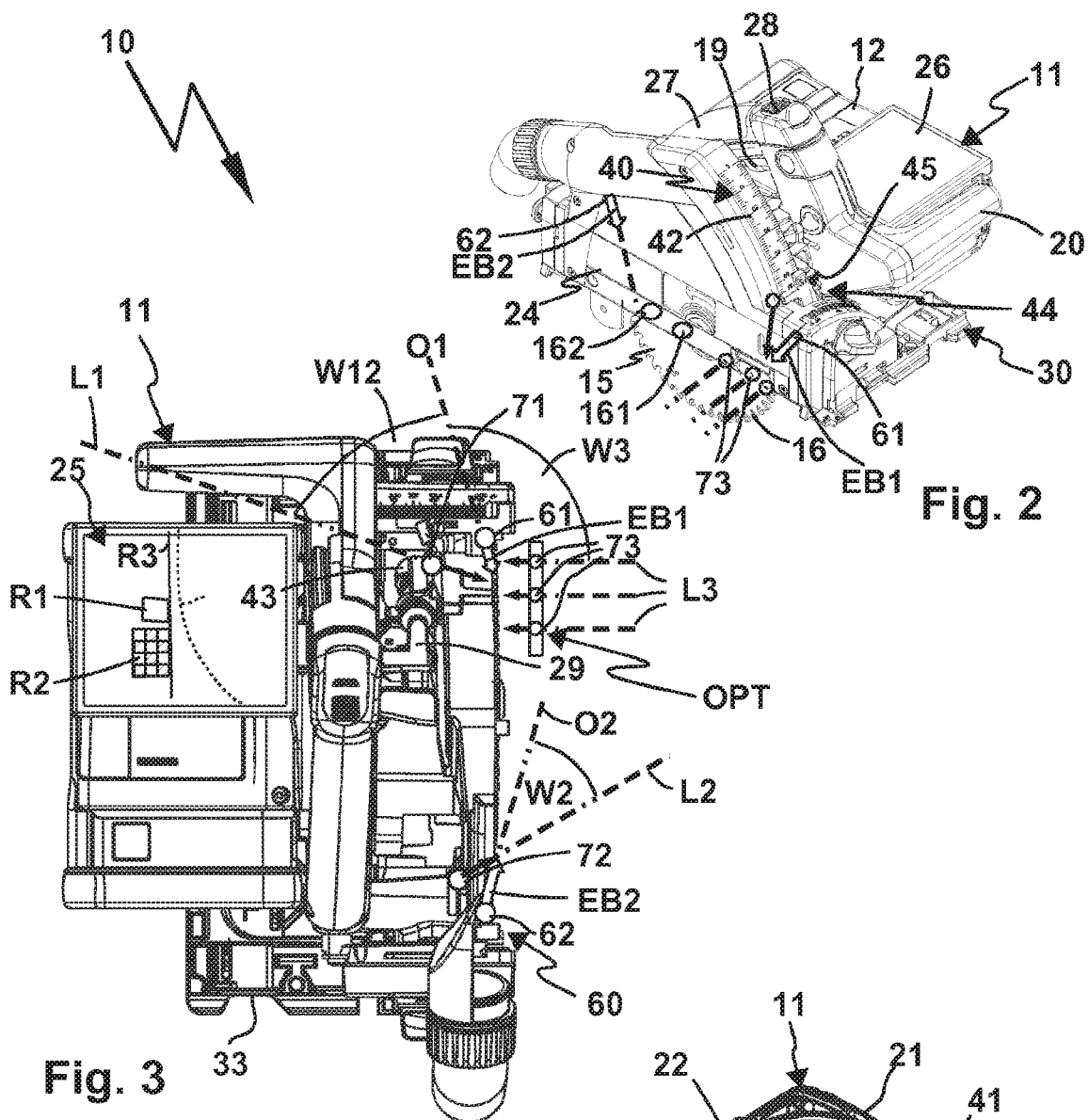
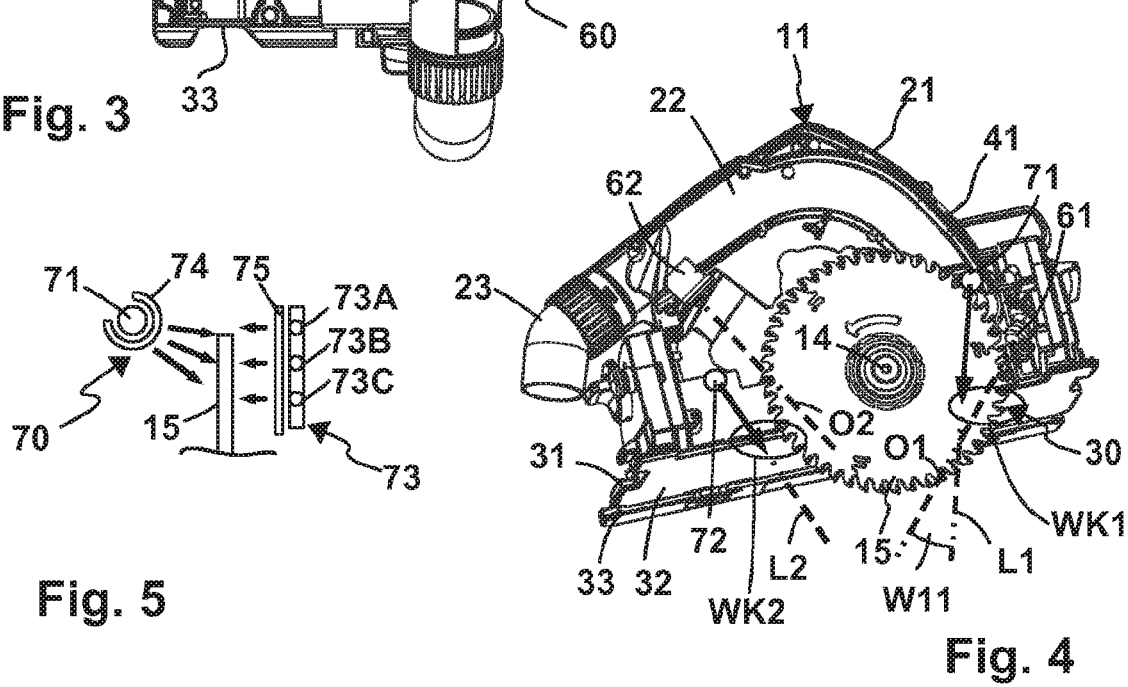

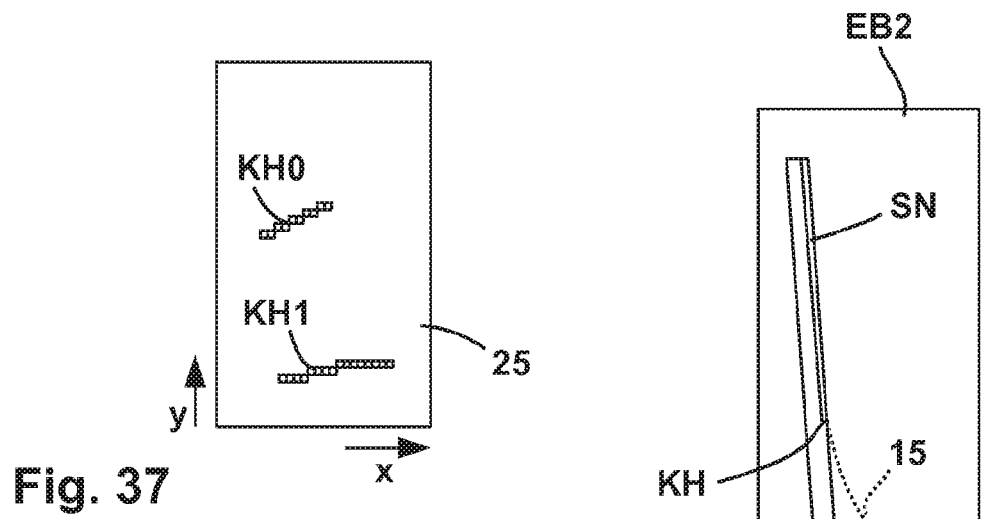
Fig. 37
Fig. 35
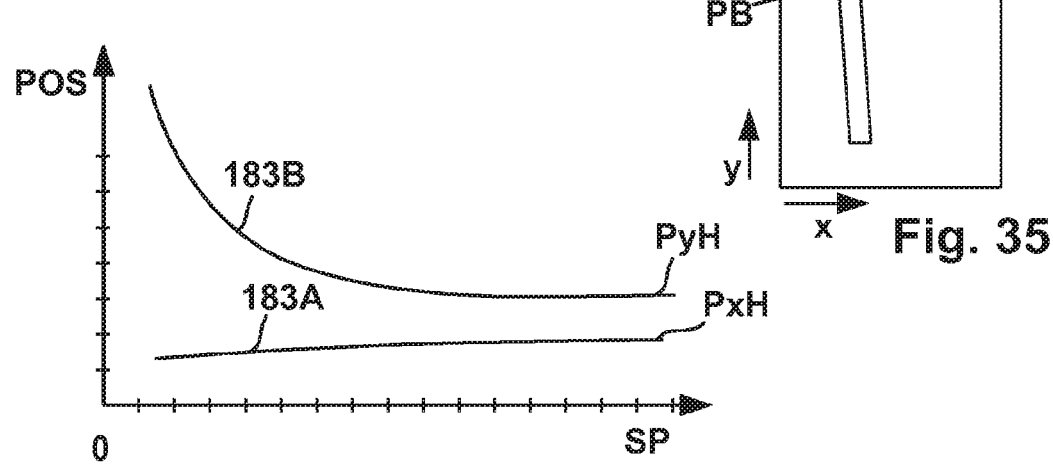
Fig. 36
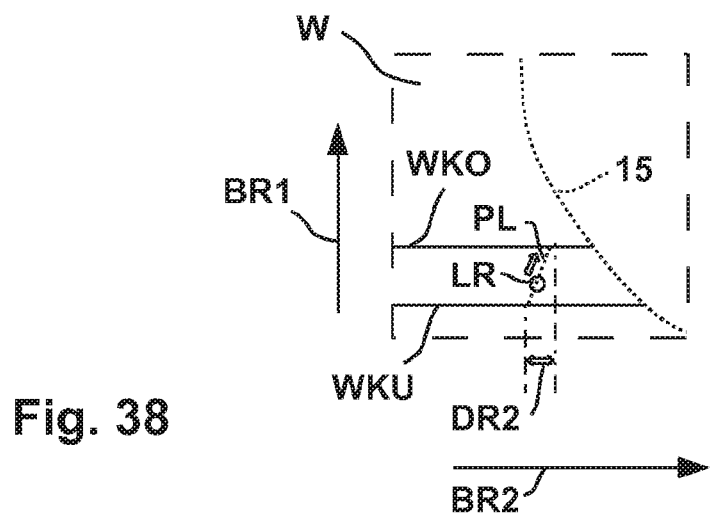
Fig. 38

MOBILE POWER TOOL

This application claims priority based on an International Application filed under the Patent Cooperation Treaty, PCT/EP2018/076254, filed Sep. 27, 2018, which claims priority to DE 102017122743.1, filed Sep. 29, 2017 and to DE 102017129813.4, filed Dec. 13, 2017.

BACKGROUND OF THE INVENTION

The invention relates to a mobile machine tool, namely a manually-operated machine tool or semi-stationary machine tool, for machining a workpiece, wherein the machine tool has an in particular plate-like guide element with a guide surface for guiding the machine tool on the workpiece or the workpiece on the machine tool, wherein the machine tool has a drive unit with a drive motor for driving a tool holder arranged on the drive unit in order to hold a work tool, wherein the machine tool has a tool sensor, the detection range of which is directed at at least a partial region of the machine tool, and wherein the machine tool has an evaluation device for evaluating a tool sensor signal generated by the tool sensor.

Such a machine tool is for example described in EP 1 980 363 A1. The machine tool has as tool sensor a camera, the image from which is displayed on a display. The image on the display changes depending on the arrangement and orientation of the camera. The displayed image is thus to a great extent dependent on the orientation of the camera.

SUMMARY OF THE INVENTION

The object of the present invention is therefore to provide a machine tool with improved sensors.

In order to achieve this object, in a machine tool of the aforementioned type a reference marking which can be detected by the tool sensor is arranged within the detection range of the tool sensor and the evaluation device is configured to determine at least one correction value for the tool sensor signal depending on the reference marking.

It is thereby a fundamental concept that the reference marking is so to speak detected by the tool sensor itself and the evaluation device, which can also form a part of the tool sensor, determines at least one correction value with reference to the reference marking. With the at least one correction value, the tool sensor signal can be corrected accordingly, for example the orientation can be adjusted on the basis of an output information generated by means of the tool sensor signal, for example on an output device, for example a screen or a display. Thus, an orientation of an image of a workpiece contact region can for example be brought into alignment with further components, for example a side edge of the guide element. Thus, the operator can for example follow the progress of work on the output device with reference to an image which has been oriented optimally in relation to the other components of the machine tool.

It is preferred if the reference marking comprises or is formed by a line or a pattern.

The reference marking expediently comprises a line or an arrangement of lines, a pattern or the like. Particularly advantageous is a checkerboard pattern. However, for example barcodes or other geometrical patterns can also be used as reference marking. It is also possible that the reference marking comprises one or more points. For example, the relation between different reference points can be used by the evaluation device in order to determine the at least one correction value.

It is further advantageous if the reference marking represents a unique reference marking, for example a code.

The reference marking can for example be or comprise a QR code (QR=Quick Response) or a comparable pattern.

It is particularly preferable if the at least one reference marking differs in terms of size and/or geometry and/or extent and/or colour and/or contrast from a functional component of the machine tool in the vicinity of the reference marking which does not fulfil the function of the reference marking. The functional component of the machine tool is for example a section of the guide element or of the machine housing. For example, the reference marking has a different colour or a different colour spectrum from a wall surface on which it is arranged.

Advantageously, the reference marking has at least one colour and/or at least one contrast which differs by a predetermined degree from a typical colour spectrum of an environment of the reference marking or which differs by a predetermined value from a typical contrast range of an environment of the reference marking. For example, a colour distance of at least one colour of the reference marking differs by a predetermined value from the colour temperature of the environment of the reference marking. A Euclidian distance amounts for example to at least 0.5-1.0 between the colours of the reference marking and the environment, so that it is apparent to a practised eye. However, the Euclidian distance can also be greater, for example within a value range of 2-4. The light-dark contrasts of the environment of the reference marking, for example a wall surface next to the reference marking, amount for example to 5 to 1 or 10 to 1, whereas the contrasts in the reference marking are higher, for example at least twice as great or three times as great. This is for example the case with a checkerboard pattern or a QR code with white and black or dark grey areas.

It is particularly preferable if the reference marking comprises or is formed by a control marking, for example a control pattern, a line arrangement or the like, provided specially for the purpose of determining the correction value. The control marking is for example a geometrical structure which is arranged on the machine tool exclusively or specially in order to determine the correction value. The control marking or the control pattern is for example designed or provided in the form of a varnish, coating, foil or the like. The control marking preferably serves as a reference marking exclusively for the purpose of determining the correction value and otherwise has no function, for example no mechanical supporting function or the purpose of limiting an opening.

However, it is also possible that one or more components which in any case, so to speak, form part of the machine tool can be used as reference marking. For example, according to one variant of the invention the reference marking is formed by at least one contour of at least one mechanically functional component of the machine tool, for example at least one contour of the work tool and/or of the guide element, or comprises the at least one contour. A mechanically functional component of the machine tool is for example a drive component, a guide component, a supporting structure or the like. Conversely, a purely optical marking, for example in the form of a coloured and/or structured surface, which is applied specially for the purpose of determining the correction value, is not understood as a mechanically functional component in this context.

For example, an edge of the work tool, of the guide element or the like can form or comprise such a contour. If several machine parts are within the detection range, in particular the visual range, of the respective tool sensor, these can, individually or as a whole, form the reference marking. It is for example possible that an edge of the guide element, for example of a saw bench or workbench, and at the same time an edge of the work tool serve as reference marking(s).

According to a preferred concept, the evaluation device is configured to analyse a curvature of a straight-line section of the reference marking in order to determine the at least one correction value. For example, a straight line can appear curved due to an optical distortion of the tool sensor or of a lens of the tool sensor. The evaluation device determines deviations from a straight line on the basis of the curvature values or geometrical values of the curved, optically registered line of the reference marking in order then to correct the tool sensor signal accordingly on the basis of these correction values or of the at least one correction value. For example, image information contained in the tool sensor signal can, so to speak, be optically straightened on the basis of the correction values which are derived from the curvature. The evaluation device is thus for example equipped to rectify image signals which are contained in the tool sensor signal or in raw signals of the tool sensor. For example, the tool sensor signal which is processed or modified by the evaluation device can, so to speak, be optically rectified.

According to a preferred concept, the tool sensor comprises or is formed by a camera. The camera is for example a digital camera.

It is further preferred if the tool sensor, in particular the aforementioned camera, is intrinsically calibrated. The intrinsic calibration is preferably multi-axial, i.e. for example biaxial or triaxial/spatial.

It is also advantageous if the tool sensor, in particular the camera, is extrinsically calibrated. The extrinsic calibration can also be a biaxial or triaxial or spatial calibration.

It is also possible that the evaluation device is equipped for intrinsic calibration of the tool sensor. For example, an arrangement of one or more control patterns can be provided on a background as a calibration means, in particular forming a system component of the machine tool. The evaluation device can for example capture several images of the control pattern or the control patterns and in this way determine intrinsic calibration values for the tool sensor, in particular the camera.

In the case of intrinsic calibration it is for example possible that irregularities, curvatures or other similar optical errors are so to speak equalised or balanced out through the calibration. The tool sensor can thus supply corrected/calibrated values. It is also possible that the evaluation device corrects/calibrates the tool sensor signal so to speak automatically on the basis of the values obtained through the intrinsic calibration, for example before the tool sensor signal is displayed on the display device.

The already intrinsically calibrated camera or the intrinsically calibrated tool sensor is then configured to achieve an optimal evaluation of the reference marking on the machine tool. By means of the intrinsically calibrated camera or the intrinsically calibrated tool sensor, the evaluation device can for example determine a relative alignment and/or orientation of the camera or of the tool sensor in relation to the reference marking.

Preferable is a so-called extrinsic calibration of the at least one tool sensor in relation to the reference marking.

For example, the evaluation device can convert or transform an in particular global, two-dimensional or three-dimensional coordinate system provided through the reference marking into a local coordinate system relating to the respective pose, i.e. the orientation and positioning of the camera or of the tool sensor in space.

Preferably, the evaluation device is configured, by means of the intrinsically calibrated camera or the intrinsically calibrated tool sensor, to carry out a so-called extrinsic calibration, namely a calibration in relation to the at least one reference marking of the machine tool. Thus, an alignment and/or orientation of the test regions by means of the reference marking can for example be realised through the evaluation device.

According to a preferred concept, the evaluation device is configured to determine a test region within the detection range with reference to the reference marking. For example, a test region is determined with reference to the reference marking within which a cut edge or machined edge is formed which is created during the machining of the workpiece, depending on the work tool. Thus, within the detection range, which may for example be quite large, a smaller test region in comparison with the detection range is determined which is used for a detailed evaluation. In this way, interference information located outside of the test region, for example chips, light reflections or the like, can so to speak be masked out. The evaluation device "concentrates", so to speak, on the region essential for the evaluation, namely the test region.

The test region is thus determined or determinable independently of an installation position and/or orientation of the respective tool sensor. If for example a tool sensor, in particular a camera, is, in departure from an ideal installation position and/or orientation, mounted on the machine housing or in the machine housing or another component of the machine tool, the machine tool also determines the test region for this suboptimal installation position and/or orientation of the tool sensor. Installation tolerances or tolerances of the tool sensor per se, for example an installation position of a digital image sensor in relation to a camera axis or the like, are so to speak automatically compensated.

When the work tool is removed from the workpiece, the, or a, test region can for example be determined on the basis of a saw cut or other machining contour. In this situation, an orientation of the test region, for example the course of a sawn edge or other machined edge, is for example particularly simple to realise.

It is preferred if the evaluation device is configured to determine the test region, or a test region, within the detection range of the tool sensor with reference to a machining contour on the workpiece created by the work tool, for example a sawn edge, which runs in the working direction of the machine tool. Such a machining contour can readily be detected, in particular by means of filtering, edge detection or the like. The test region is for example oriented on the machining contour. The machining contour is for example created through a sort of test machining of the workpiece, for example a saw cut, wherein the test machining is only, or preferably, carried out for the purpose of calibration and/or orientation of the test region on the workpiece. The arrangement and/or orientation and/or geometrical form of the machining contour depends for example on whether the machine tool is used with or without a guide rail or a guide device. Furthermore, the type and geometry of the work tool, wear on the work tool or the guide device and the like can for example have an effect on the machining contour. Such influences on the machining contour are so to speak taken into consideration by the evaluation device if the machining contour is used to determine the test regions.

Several test regions can readily be set up and/or stored in the machine tool or the evaluation device. For example, a test region with guide rail and a test region without guide rail can be determined or determinable.

According to a preferred concept, the machine tool, for example the evaluation device, is configured to orient an optical information generated or generatable by means of the tool sensor signal relative to the reference marking. For example, an optical information which represents the contact region of the work tool with the workpiece can so to speak be oriented relative to the rest of the machine tool on the basis of the at least one correction value.

The relative position detectable by the position sensor can be an adjusted or adjustable relative position of the drive unit relative to the guide element. The relative position can be an actual relative position, that is to say a current position of the drive unit relative to the guide element, or a target relative position, for example a relative position, adjustable by means of a stop, which the drive unit assumes relative to the guide element on coming to rest against the stop.

The position sensor can comprise one or more position sensors. The same naturally applies to the tool sensor, which can comprise one or more tool sensors. One could also describe the position sensor according to the claims as "at least one position sensor" and the tool sensor as "at least one tool sensor".

The basic concept of the machine tool assumes that on the one hand the working region can be scanned directly with a tool sensor, for example in order to enable simple handling by the operator, in order to determine a position of the work tool or the like. In this way the operator can for example recognise if, and where, the work tool engages with the workpiece. A further sensor, namely the position sensor, can determine the relative position of the work unit relative to the guide element, so that for example a current and/or adjusted working depth or penetration depth of the work tool within the workpiece can be monitored. For example it is possible that the position sensor displays, on a scale provided on a display of the machine tool, the respective relative position of the drive unit and/or a so to speak future adjustable relative position of the drive unit relative to the guide element, and thus also the assigned adjustment position of the drive unit and of the work tool relative to the workpiece.

The evaluation device preferably has an optical display device, in particular a screen, an LCD display, an LED display or the like, for displaying at least one piece of optical information which is or can be generated on the basis of a sensor signal of the position sensor and/or of a sensor signal of the tool sensor. Thus, if it includes a camera the tool sensor can also for example display an image of the workpiece contact region on the optical display device. The position sensor can for example generate a position signal which is superimposed in the display device or displayed by the display device as a marking, light signal, scale display or the like.

In one case the optical display device comprises individual light signals, for example LEDs or the like. Lightbars or rows of lamps, in particular LEDs, are also readily possible. A comfortable display is for example achieved through an LCD display. It is also advantageous if a graphic display is provided as display device or if the display device comprises a graphic display, so that for example a real image of the workpiece contact region can be displayed on the display device.

The optical information which can be displayed on the optical display device comprises for example an adjustment position information for displaying an adjustment position of the drive unit relative to the guide element and/or relative to the workpiece. The evaluation device generates the adjustment position information on the basis of a position signal of the position sensor. The adjustment position information can for example comprise or be formed by a linear representation, a point representation or the like. However, the adjustment position information can also be or comprise a scale display or dimension display. For example, the relative position of the drive unit in relation to the guide surface or to the surface of the workpiece is signalled through the adjustment position information. This allows the operator to recognise for example how far the work tool has already penetrated into the workpiece, for example in the case of a separating cut, milling or the like.

The adjustment position information is expediently an adjusted actual relative position of the drive unit relative to the guide element. If, then, the position of the drive unit is adjusted relative to the guide element, this is represented through the actual relative position or the adjustment position information. However, it is also possible that the adjustment position information comprises a target relative position which can be set through an adjustment of the drive unit relative to the guide element. For example, a stop position or a predetermined or predeterminable target adjustment position which the drive unit is supposed to assume relative to the guide element can be displayed through the adjustment position information.

According to an advantageous embodiment of the invention it can namely be the case that the target adjustment position of the drive unit relative to the guide element can be predetermined through a stop which is or can be fixed in relation to the guide element. If the drive unit is adjusted relative to the guide element, it for example comes to rest against the stop, wherein the target adjustment position of the drive unit predetermined through the stop is displayed on the display device as adjustment position information. The stop can be fixed, i.e. it can for example be formed by a projection or a surface on the guide element. However, it is also possible that the stop is adjustable relative to the guide element, for example in order to adjust a penetration depth or working depth of the work tool within the workpiece.

The optical display device is expediently configured to display a workpiece marking arranged on the workpiece and/or to reproduce image information captured by the tool sensor depicting the workpiece contact region. For example, the workpiece marking, in particular a line or other optical marking on the workpiece, can be detected by the tool sensor, wherein this is displayed on the display device. However, as already mentioned, the workpiece contact region can also be imaged or captured by the tool sensor and output as image information, wherein the image information is made visible to the operator by the display device.

The image information relating to the workpiece contact region and/or the marking on the workpiece is expediently displayed on the display device synoptically with the aforementioned adjustment position information.

Preferred is a calibration of the position sensor and/or its position signal:

Expediently, the evaluation device comprises a calibration means for calibrating a position signal determined by the position sensor with reference to an actual tool position signal determined by the tool sensor. The position sensor or its position signal can also be calibrated with reference to the actual tool position signal. The position sensor can for example output non-linear position values or position signals which are so to speak calibrated with reference to the actual tool position signal and converted into linear values and/or values representing a respective adjustment position, for example a depth adjustment position, of the drive unit relative to the guide element. The actual tool position signal comprises for example the real engagement region of the work tool in the workpiece, for example a saw cut, a separating cut or the like. It is also for example possible that the position signal is not linear and is linearised on the basis of the actual tool position signal. It is also possible that, for example due to the movement kinematics of the drive unit relative to the guide element, the position signal does not represent the actual insertion depth or penetration depth of the work tool in the workpiece. If for example the drive unit swivels around an axis relative to the guide element and thus relative to the workpiece, the work tool describes for example a circular path with a motion vector perpendicular to the guide plane and a motion vector parallel to the guide plane, the amounts of which differ depending on the respective arc segment, which results in different effects for example on a front and/or rear machined edge of the work tool on cutting into or engaging with the workpiece.

The actual tool position signal can for example represent an edge region of the work tool and/or a machined edge, in particular a cut edge, on the workpiece formed through a machining of the workpiece by means of the work tool. Thus, a front or rear cut edge or machined edge, viewed in the working direction of the work tool, can for example be detected by the tool sensor and represented by the actual tool position signal.

Advantageous measures are provided for the registration and/or processing of the actual tool position signal:

In order to determine the actual tool position signal the evaluation device expediently comprises at least one optical filter and/or a digital filter or uses such a filter. For example, a better actual tool position signal can be determined through an optical filtering, a greyscale filtering, a polarisation filtering or the like. A digital filtering, in which for example blurring, vibrations or the like are filtered out through software filters or the like, is expedient in connection with the determination of the actual tool position signal.

According to a further advantageous measure, the calibration means is configured to generate assignment information.

The evaluation device is advantageously configured to determine an information relating to a machined edge on the workpiece, for example a cut edge, which has been formed or is being formed through a machining of the workpiece by means of the work tool on the basis of the assignment information and an adjustment position of the drive unit relative to the guide element which has been or can be set on the machine tool. The assignment information comprises for example an assignment table, a mathematical assignment function or both. The set or settable adjustment position of the drive unit relative to the guide element is expediently detected or detectable by the position sensor.

The assignment information expediently serves to allow the evaluation device to use the adjustment position of the drive unit relative to the guide element, in particular as registered by means of the position sensor, to determine an information relating to a machined edge on the workpiece which is being formed or which has already been formed through a machining of the workpiece by means of the work tool. If for example a stop represents an adjustable setting position of the drive unit, this adjustment position is registered by the position sensor. The evaluation unit determines on the basis of the position signal and the assignment information an information which corresponds to the machined edge actually being formed on the workpiece, namely a target position. If the operator adjusts the drive unit relative to the guide element up to the adjustment position which is predetermined by the stop, the work tool cuts into the workpiece as far as the target position determined and/or displayed in this way, so that the machined edge or cut edge is formed. The operator can also already recognise, with reference to the information which is preferably displayed on the display device, to which depth and/or up to which location they will cut into the workpiece.

However, it is also possible that the information determined on the basis of the position signal and the assignment information represents an actual cut edge or machined edge already being formed during the current machining of the workpiece. If therefore, for example while machining the workpiece, the tool sensor has no view, so to speak, of the workpiece contact region, i.e. because this is for example obscured by safety elements, covers or the like, dust etc., the evaluation device determines on the basis of the position signal and the assignment information an information as to the actual location of the work tool in order for example to display this information on the display device or otherwise use it for the further machining of the workpiece.

Precision is significantly increased through the above measures. Mechanical tolerances, for example in the assembly of the machine tool, in the bearing arrangement, in the installation of the position sensor and/or of the tool sensor, are so to speak bridged or compensated or eliminated. On the basis of the assignment information, the position signal can so to speak be interpreted as a position signal which represents the actual adjustment position of the drive unit relative to the guide element or an adjusted position, for example of a stop for the drive unit.

The assignment information advantageously relates to at least two assignment coordinates or assignment axes oriented at an angle to one another.

The assignment information is thus expediently multi-axial, in particular in relation to two assignment axes oriented at an angle to one another, in particular at right angles to one another. For example, the tool sensor signal of the tool sensor contains image information or pixels which are provided in directions oriented at an angle to one another, for example an x-direction and a y-direction. Accordingly, the assignment information for the position signal relates both to one assignment axis, for example the x-axis, as well as to the other assignment axis, for example the y-axis, in particular to assignment axes oriented at right angles to one another. If for example the image information of the tool sensor not does not align exactly with a working direction of the machine tool in relation to the workpiece in which the workpiece can be guided along the machine tool or, conversely, the machine tool can be guided along the workpiece, an unequivocal assignment information for the position signal is nonetheless determined through the assignment of the image information to an x- and a y-assignment axis or in any case two assignment axes oriented at an angle to one another.

Thus, the position signal can for example represent an adjusted working edge, for example a front or rear working edge of the work tool relative to the workpiece, exactly, for example precisely to within 0.1 to 0.5 mm, wherein the precision is limited solely by the resolution of the tool sensor, for example its digital resolution, and the resolution of the display device or of the position sensor. Any mechanical tolerances which can arise in the machine tool, the work tool or the like are thus practically eliminated. Regarding the mechanical tolerances which have already been mentioned, it should also be pointed out that these can for example also arise through wear on the work tool.

According to an expedient concept, the position sensor and the tool sensor embody two different physical measuring principles.

It is further advantageous if the tool sensor comprises or is formed by a camera and the position sensor is not a camera. However, it should be mentioned at this point that both the position sensor and the tool sensor can be formed by cameras or comprise cameras. Also, both the position sensor and the tool sensor could be formed not by cameras but for example by optical sensors using different measuring principles, inductive sensors or the like, or could comprise such sensors.

According to a preferred concept, the machine tool is provided with an illumination device for illuminating the workpiece contact region. By means of the illumination device, in particular an LED arrangement or the like, the workpiece contact region is made readily visible, which facilitates or improves registration by the tool sensor.

It is preferred if at least one filter, in particular a polarisation filter and/or a colour filter and/or a grey filter, is installed before the tool sensor. The tool sensor is in this case for example an optical sensor, a camera or the like. Reflections can for example be filtered by means of a polarisation filter, in particular a linear polarisation filter or a circular polarisation filter, so that the signal of the tool sensor is influenced less, or not at all, through reflections. A colour filter can for example limit the colour spectrum detectable by the tool sensor so that colours which are not relevant, for example a colour of a wood or the like, are filtered out from the outset. A grey filter, which can have a single grey scale value or also a grey gradient or denser and less translucent zones can so to speak mask out bright regions.

An advantageous illumination device illuminates the workpiece contact region and/or the detection range of the tool sensor or the detection ranges of the tool sensors with a brightness which is preferably greater than a brightness of an environment of the machine tool. For example, an illumination with a brightness which is typically not exceeded in working areas is possible. In this way, an interfering influence of ambient light can for example be minimised or avoided, which improves the detection quality of the tool sensor.

In an advantageous illumination device, the brightness can be adjustable. This is for example possible by means of an adjusting element or a graphic user interface provided on the machine tool. However, an automatic brightness adaption is also advantageous, i.e. the machine tool has at least one brightness sensor, in particular registering an ambient light around the machine tool, and is configured to adjust a brightness of the illumination device depending on the brightness of the environment of the machine tool.

The tool sensor and/or the position sensor can comprise or be formed by different sensors or measuring principles. The following are named by way of example, whereby combinations of these sensors or measuring principles are readily possible in the tool sensor and in the position sensor:

A camera, an inductive sensor, a capacitive sensor, an optical sensor, a tilt sensor, an acceleration sensor, a distance sensor, an electrical measuring resistor or the like.

For example, an electrical measuring resistor can be provided on a guide of the drive unit relative to the guide element. An optical sensor, for example a sensor with a laser, a photocell or the like, can be provided to register the position. A tilt sensor which can for example detect a tilt or swivel of the drive unit relative to the guide element is also advantageous. By means of inductive measuring principles or capacitive measuring principles it is possible to detect for example a position of the work tool relative to the guide element.

It is advantageous if at least one position sensor is provided on the bearing arrangement.

The position sensor comprises for example a position sensor arranged on an angle adjustment device for adjusting an angular position of the work unit relative to the guide element. For example, a position sensor can be provided on an angular guide or the like.

It is further advantageous if the position sensor comprises or is formed by a position sensor arranged on a depth adjustment device for adjusting a penetration depth of the work tool in the workpiece. For example, the position sensor can detect the position of a stop which is mounted moveably on the depth adjustment device.

It is further advantageous if the position sensor comprises a position sensor arranged on a guide device, for example a linear guide, a swivel guide, an arc guide or the like, wherein the guide is provided in order to guide the drive unit relative to the guide element.

It is also possible to provide a position sensor on a swivel bearing or sliding bearing of the bearing arrangement.

Naturally, several of the aforementioned position sensors can be provided, for example a position sensor on the guide device and a position sensor on the bearing arrangement.

Preferably, the machine tool is provided with a depth adjustment device for adjusting a penetration depth of the work tool in the workpiece. The depth adjustment device comprises a mounting contour which is arranged on the guide element. A stop element is mounted moveably on the mounting contour and/or can be fixed in a setting position assigned to a respective adjustment position of the tool holder relative to the guide surface/to the workpiece or the workpiece surface. The drive unit comes to rest against the stop element in the respective setting position. In this way, the operator can also set a desired penetration depth or machining depth of the work tool in the workpiece by means of the depth adjustment device. Such a depth adjustment device is for example suitable in order to adjust a target adjustment position of the drive unit relative to the guide element.

It is preferred if the position sensor comprises or is formed by a position sensor for detecting the setting position of the stop element in relation to the mounting contour. For example, an electrical measuring resistor is arranged on the mounting contour which can detect the position of the stop element. However, an optical principle by means of which the stop element can be detected, or the position of the stop element relative to the mounting contour and thus the guide element, is also expedient. Other measuring principles, for example inductive, capacitive or other measuring principles are also readily possible in the position sensor which detects the stop element or its position.

The evaluation device is expediently configured to actuate the drive motor and/or an actuating drive in order to adjust the drive unit relative to the guide element depending on a sensor signal of the at least one position sensor and/or of the tool sensor. For example, the drive motor can be shut off automatically or the drive unit adjusted automatically if a respective target adjustment position is reached. However, it is also readily possible that the aforementioned optical display device is provided in this embodiment too, i.e. that the operator can see what the machine is doing automatically, for example by means of the optical display device, or that the operator can switch the machine over from an automatic mode in which the evaluation device controls the drive motor or the actuating drive into a manual mode in which they machine the workpiece so to speak with reference to the optical display device. For example, the evaluation device can shut off the drive motor if a saw cut or another workpiece machining operation is completed. It is also possible that the evaluation device controls the actuating drive such that for example the work tool is moved away from the workpiece or towards the workpiece.

It is preferred if the machine tool is provided with not just one tool sensor but several, in particular at least two tool sensors.

Preferably, a tool sensor arrangement is provided which comprises at least two tool sensors, each covering a respective partial workpiece contact region of the workpiece contact region on opposite sides of the work tool. A section of the work tool engages in the workpiece in each partial workpiece contact region. For example, a front side, viewed in the working direction, and a rear side, viewed in the working direction, of the work tool can in each case be covered by a tool sensor. The aforementioned assignment information or the like can in this way be determined significantly more precisely because for example the respective penetration depth of the work tool in the workpiece can be detected not just by one tool sensor but by several tool sensors.

It is namely advantageous if the evaluation device is provided with a calibration means, in particular the calibration means mentioned and explained above, for calibrating a position signal determined by the position sensor on the basis of workpiece actual position signals determined through tool sensors assigned to the partial workpiece contact regions of the workpiece contact region. This allows a significantly greater precision to be achieved.

It is further advantageous if the machine tool, for example the evaluation device, is configured to determine a positioning of the guide element on a guide device, for example a guide rail, for guiding the guide element. The guide element can for example be guided or guidable on the guide device or guide rail in a straight line in a working direction. A machining depth or penetration depth of the work tool in the workpiece depends on whether the guide element is arranged on the guide device or next to the guide device. For example, in order to achieve the same penetration depth or machining depth of the work tool in the workpiece, the drive unit needs to be swivelled further in the direction of the guide element if the guide element rests on the guide rail/guide device and not directly on the workpiece. The evaluation device can for example perform the aforementioned calibration, assignment of position signals and image signals on the display devices or the like depending on a positioning of the guide element on the guide device or next to it, for example directly on the workpiece. In this way, the respective height of the guide rail or guide device, i.e. the distance from the upper side of the guide device to its underside resting on the workpiece, is so to speak automatically included in the calibration, assignment of signals and the like by the machine tool.

However, different sensor concepts or image processing concepts can be used to detect a guide rail, for example the relation of an edge of the machine tool to the workpiece and/or the guide rail. A guide rail can also for example be identified on the basis of unique optical characteristics, for example its straight longitudinal extension, its colour, its patterning or by means of a unique identifier, for example a bit pattern or line code. Finally, an image comparison or template comparison is also possible in which the image of the guide rail captured by the tool sensor is compared with a comparison image.

It is preferred if a tool sensor or all tool sensors of the machine tool are arranged at a distance from the guide surface. For example, the drive unit extends away from the guide surface to a maximum height. The maximum height is for example defined by an upper side of a machine housing of the drive unit, whereas the guide surface so to speak represents the underside of the machine tool. The tool sensor is preferably arranged on the machine tool at a distance from the guide surface which amounts to at least 20%, preferably 30%, in particular 40% or 50% of a maximum height by which the drive unit extends away from the guide surface.

According to an advantageous embodiment, the tool sensor arrangement has at least two tool sensors, the detection ranges of which are assigned to different partial workpiece contact regions of the workpiece contact region.

Advantageously, the work tool engages at least partially between the detection ranges of the tool sensors, so that the detection range of one tool sensor assigned to the partial workpiece contact region is at least partially obstructed by the work tool so as to prevent registration by the other tool sensor.

Advantageously, in the machine tool or a machine tool of the aforementioned type, the tool sensor arrangement comprises at least two tool sensors for detecting a respective partial workpiece contact region of the workpiece contact region on opposite sides of the work tool, wherein a section of the work tool engages in the workpiece in each partial workpiece contact region.

The two tool sensors (several tool sensors can also be provided) thus in each case cover partial workpiece contact regions. The partial workpiece contact regions optimally lie within the detection ranges of the respective tool sensors, which allows a significantly improved view of the workpiece contact region. However, a "view of the workpiece contact region" should not be understood to the effect that only a camera or an optical sensor can be used. Other measuring principles for the tool sensors are also advantageous at this point, for example capacitive, inductive or similar measuring principles or detection principles, in particular ones which work or function in a contact-free manner.

It is preferred if the detection ranges are assigned to opposite sides of the work tool. Thus, each tool sensor covers the respective partial workpiece contact region on one side of the work tool.

The partial workpiece contact regions of the workpiece contact region are expediently provided on opposite sides of the work tool.

The partial workpiece contact regions on opposite sides of the work tool are for example wholly or partially obstructed by the work tool, so that the partial workpiece contact region which is assigned to one tool sensor is not covered, or is only partially covered by the other tool sensor.

It is further possible that the machine tool has several, i.e. more than two, tool sensors for detecting a respective partial workpiece contact region. The tool sensors are preferably arranged in a row next to one another. It is for example possible that two tool sensors are assigned to opposite sides of the work tool or cover partial workpiece contact regions located there and the detection range of a third or further tool sensor lies between the detection ranges of the two aforementioned tool sensors.

Expediently, the machine tool has at least three tool sensors which are arranged in a row arrangement which runs, in the geometry of an outer circumferential contour of the work tool, around its outer circumferential contour. It is thus possible that the tool sensors are for example arranged in a row next to one another around an outer circumference of the work tool. An arrangement of the tool sensors in a row expediently correlates with an outer circumferential contour or expediently corresponds to an outer circumferential contour of the work tool. For example, in the case of a straight-line work tool the tool sensors can be arranged in a row arrangement along a straight line. In the case of a curved or arc-formed work tool the sensors are arranged along a curved or arc-formed row.

This means that each tool sensor can optimally cover the partial workpiece contact region in each case assigned to it. For example, a row arrangement of three or more tool sensors can be provided on the outer circumference of a milling tool.

According to an advantageous measure, one partial workpiece contact region corresponds to an entry region of the work tool in the workpiece and the other workpiece contact region corresponds to an exit region of the work tool from the workpiece. Such an arrangement is in particular advantageous in the case of plunge saws or other similar machine tools the work tool of which penetrates into the workpiece from above, so to speak, wherein the outer circumference of the work tool engaging in each case with the workpiece surface of the workpiece increases with increasing penetration depth of the work tool into the workpiece. The operator can thus monitor both regions, the entry region and the exit region, optimally.

Expediently, the tool holder is mounted adjustably relative to the guide surface in order to adjust a penetration depth of the work tool in the workpiece, and the tool sensors are arranged in the region of a greatest distance of the partial workpiece contact regions at the maximum penetration depth of the work tool in the workpiece. Thus, there is a sufficient distance between the tool sensors so that the work tool fits within the intervening space between the tool sensors at maximum penetration depth in the workpiece. This means that the tool sensors are for example arranged in the region of a maximum radial outer circumference of the work tool.

It is conceivable that at least one tool sensor is arranged on a side of the guide element facing the guide surface. For example, a jib or arm can project from the guide element from the direction of the work unit and so to speak cover the side of the guide element facing away from the drive unit.

However, it is advantageous if at least one tool sensor, preferably both or all tool sensors, are arranged on a side of the guide element facing away from the guide surface. In other words, the tool sensors or the at least one tool sensor are arranged on the side of the guide element assigned to the drive unit. Thus, the guide surface is so to speak free of tool sensors, which facilitates the handling of the machine tool. The guide surface is freely accessible for the workpiece.

It is further advantageous if at least one tool sensor, preferably both or all tool sensors, are arranged in a dust extraction region and/or beneath a cover. It is further advantageous for the one or more tool sensors if they are arranged beneath a cover.

In this way the tool sensors are protected. In particular, the dust extraction region is as a rule provided in the vicinity of the work tool, so that the tool sensors can in each case cover their assigned partial workpiece contact region directly on the spot, namely in the vicinity of the work tool.

According to an advantageous measure, the machine tool is provided with an illumination device for illuminating the workpiece contact region. The illumination device comprises for example an LED arrangement or other illumination device.

In this connection it is preferable if, for each partial workpiece contact region, the illumination device has an illumination element for individual illumination of the respective partial workpiece contact region. In this way, an optimal local illumination is guaranteed, since the illuminating effect of the one illumination element can be matched optimally to the partial workpiece contact region or the detection range of the respective tool sensor, for example in terms of light colour, wavelength, intensity of illumination or the like. The work tool can also obstruct or shade the light emitted by an illumination element towards the detection range of another tool sensor.

According to a preferred variant, the machine tool is provided with a display device, for example a screen, for displaying sensor signals from the tool sensors. For example, the sensor signals can comprise an image information representing the respective partial workpiece contact region which can be displayed by the display device.

According to a preferred concept, the machine tool is provided with a switching device for switching between the sensor signals of the tool sensors, wherein the switchover device outputs the sensor signal of one tool sensor or the sensor signal of the other tool sensor as output signal in priority over the in each case other sensor signal depending on at least one switching condition. The switchover device can for example be part of the display or the display device. The switchover device can also be formed by an evaluation device for evaluating the sensor signals or can be at least partially realised in this manner.

The at least one switching condition comprises for example a time condition. For example, the sensor signal of one tool sensor can be output for a predetermined first time interval and then the sensor signal of the other tool sensor can be output, for example as image information on the display device. For example, on switching on the machine tool the sensor signal of the rear tool sensor, viewed in the working direction, is output first, so that the operator has time to position the work tool relative to the workpiece, for example in order to lower a saw blade into the workpiece. Following expiry of the predetermined first time interval, the switchover device so to speak switches over to the image information or to the other sensor signal of the front tool sensor, viewed in the working direction. In this way the operator can, for example in the case of an advance of the machine tool along the workpiece in the working direction or of the workpiece along the machine tool in the working direction, monitor the respective cutting region of the work tool or engagement region of the work tool in the workpiece.

However, the machine tool can also be provided with a manually operable operating element, for example a button, which can be operated by an operator. The operating element generates a switching signal which is evaluated by the switchover device in order to switch between the sensor signals from the tool sensors.

It should be pointed out at this point that a prioritised output of a sensor signal does not mean that the other sensor signal is not output. For example, the sensor signal from one tool sensor can be output as a larger image on the display device than the sensor signal from the other tool sensor.

It is further advantageous if the switching condition comprises or is formed by an acceleration signal. For example, a forwards movement or a movement of the machine tool along the working direction is detected as an acceleration. It is also possible that a plunging movement of the drive unit relative to the guide element or relative to the workpiece is interpreted as an acceleration signal. For example, in the case of the aforementioned plunging movement the plunging movement per se can be detected by the acceleration sensor. Depending on an acceleration signal, for example the acceleration signal from this acceleration sensor, the display device can for example first display the sensor signal of the rear tool sensor, viewed in the working direction. If no further acceleration towards the workpiece is then detected by the acceleration sensor, the plunging operation is completed. The display device then switches over for example to the sensor signal from the front tool sensor, viewed in the working direction.

According to a preferred concept, at least one tool sensor, expediently the tool sensor or both tool sensors, is or are arranged on the guide element. This means that the tool sensors are for example positioned very close to the partial workpiece contact regions.

It is preferred if the detection ranges of the tool sensors and/or optical axes of the tool sensors are arranged at different angles relative to an outer circumference of the work tool. For example, one tool sensor covers the work tool or its outer circumference at a steeper angle than the other tool sensor. A steeper angle makes possible a more precise edge detection. A shallower angle makes it possible for example that a larger region of the workpiece next to the work tool still falls within the detection range of the tool sensor.

It is also expedient if the detection ranges of the tool sensors have different detection angles, for example detection angles which differ by 20-50%. For example, a front tool sensor, viewed in the working direction, can be equipped with a wide-angle lens or a wide-angle detection range, whereas in comparison the other rear tool sensor, viewed in the working direction, has a narrower detection angle. However, the detection angle of one tool sensor can differ even more markedly from the detection angle of the other tool sensor, for example by at least 80%, particularly preferably by at least 100% or around 200%, in particular 200% to 300%. It can thus be seen that one tool sensor is so to speak a tool sensor with normal detection range, whereas the other tool sensor can be a type of wide-angle tool sensor.

It is possible that the detection range of at least one tool sensor may be at least partially affected by particles which are produced during the machining of a workpiece by means of the work tool. In this case it is advantageous if the machine tool is provided with at least one optimisation means to reduce the effect of the particles present within the detection range on a tool sensor signal of the tool sensor.

The tool sensor signal can be the output signal of the tool sensor or a signal generated or generatable on the basis of an output signal of the tool sensor. The output signal of the tool sensor is thus already improved by means of the optimisation means in order to generate the tool sensor signal.

It is thus a fundamental concept of the one or more optimisation means that the particles which are in any case unavoidable within the detection range, for example chips, dust or the like, are so to speak optically eliminated, or their effect on the tool sensor signal reduced, by means of the at least one optimisation means. Naturally, this does not rule out the possibility that further measures for enhancing the image quality are also provided, so that for example purge air reduces the entry of particles into the detection range of the tool sensor or flushes away particles which are present there as optimally as possible. For example, a purge air flow in the form of a suction flow or cooling air flow can be provided which so to speak flushes the particles out of the detection range. It is in particular possible that the detection range of the tool sensor is flowed through by purge air, for example by a suction flow and/or a cooling air flow of the drive motor.

However, the at least one optimisation means is expediently a separate means from the purge air, for example a suction flow or cooling air flow.

The at least one optimisation means expediently comprises or is formed by a digital signal processing means, wherein the signal processing means is intended or configured to process or form the tool sensor signal. For example, a signal which the tool sensor generates can be modified or processed by the signal processing means in order to form the tool sensor signal.

For example, the digital signal processing means comprises or is formed by at least one digital filter for filtering pixels generated by the particles. The pixels are for example interference information which is filtered out by the digital filter. The digital filter is for example formed by a program code which can be executed by a processor of the machine tool.

The digital signal processing means can expediently comprise a rank order filter. However, a histogram filter, a brightness filter or the like are also readily advantageous. It is possible that the aforementioned filters are combined with one another, i.e. a brightness filter is for example fitted, and then a rank order filter.

In the case of the rank order filter it is advantageous if it comprises or is formed by a so-called median filter. If for example further image information is collected within a defined vicinity of a pixel, an average grey value, i.e. a median, is selected from this sorted list, the interference pixel then being replaced with an average value, in particular a grey value or colour value.

However, other filters, for example a Gauss filter and/or a bilateral filter and/or an averaging filter, can also advantageously be provided. A Gauss filter is for example a so-called frequency filter, in which a respective step response contains no overshoot and at the same time a maximum edge steepness is achieved in the transition region. The transmission function and the pulse response have for example the form of a so-called Gaussian bell curve.

A bilateral filter is for example a non-linear filter which is used in order to soften images while at the same time preserving object edges. An object edge can for example be a saw cut in the workpiece. However, a surface or edge of the work tool can also be filtered in this way.

A histogram filter or histogram equalisation is advantageous in order for example to achieve a more even or better brightness distribution. That is to say the signal from the tool sensor becomes more even in terms of its brightness distribution and/or colour distribution as a result of the histogram balancing.

A sliding coating is preferably provided on a front side or a transparent cover of the tool sensor, along which the particles slide or which the particles can slide off. The transparent cover is for example formed by a front lens of the tool sensor. A filter or a transparent plate can also be provided as transparent cover.

However, the at least one optimisation means can also comprise or be formed by an illumination device. In this way the detection range is so to speak deliberately brightened or illuminated by the illumination device, which significantly improves the image registration.

In order to illuminate the detection range, the illumination device is expediently arranged at an angle transverse to an optical axis of the tool sensor, in particular a camera. In particular, the illumination device represents or forms the exclusive illumination of the detection range. Thus, the detection range is deliberately not illuminated in or near to the optical axis of the tool sensor, so that interfering reflections occur, because in this case the particles would reflect back the light from the illumination device so to speak along the optical axis or the detection axis of the tool sensor.

The aforementioned angles between the optical axis of the tool sensor and the light source are expediently formed in relation to at least one plane, preferably to several planes. For example, the angles are formed in relation to a plane oriented parallel to the guide surface and/or oriented at an angle, for example a right angle, to the guide surface.

It is advantageous if this angle is at least 30°. Steeper angles, for example 45°, at least 60° or the like, are however more advantageous. An angle of for example around 80-120°, in particular around 90°, is particularly favourable.

Accordingly, a central axis or light beam central axis is arranged at an angle of for example 30°, 40°, 60° or particularly preferably 80-90°. That is to say the detection range is so to speak illuminated transversely to the optical axis of the tool sensor.

It is expedient if the illumination device is designed to provide a diffuse illumination of the detection range. For example, the illumination device comprises one or more light sources arranged behind a diffusing lens, for example a Fresnel lens, a matte lens or the like. This prevents for example strong and/or localised reflections, for example on the particles, a workpiece surface or components of the machine tool.

According to an advantageous concept, the illumination device is arranged so as to illuminate the detection range of the tool sensor from opposite sides. For example, the illumination device has lamps on opposite sides of the detection range, in particular LEDs or the like. If illumination takes place from opposite sides, it is again advantageous if an angle between the light beams or the main radiation axes of a respective lamp and the optical axis of the tool sensor is at least 30°, preferably at least 45°. It is particularly favourable if the main axes or beam axes of the lamps or the illumination device are arranged at an angle of around 80-120°, in particular around 90°, to the optical axis of the tool sensor. The illumination from opposite or both sides, for example at right angles to the saw blade or other work tool, prevents or in any case reduces cast or hard shadows.

It is further advantageous if the machine tool is provided with an enclosure device to shield the detection range from extraneous light influences. In this way the detection range is so to speak protected against extraneous light influences. If the aforementioned illumination device is arranged within the detection range, a targeted illumination of the detection range is possible, so that an optimal matching of the illumination device and the tool sensor is possible. For example, a specific light colour can be generated which can be detected optimally by the tool sensor.

The enclosure device can be a so to speak dedicated enclosure device covering the detection range, for example a mask or the like. However, it is also possible that components of the machine tool which are necessary in order to protect the work tool or for other measures, for example a dust cover or the like, form a part of the enclosure device or represent the enclosure device as a whole.

If the machine tool is removed from the workpiece or the workpiece is removed from the machine tool, the detection range can at least partially be exposed to extraneous light. However, it is preferred if the enclosure device and the workpiece shield, or at least substantially shield, the detection range from extraneous light influences during operation of the machine tool. If the illumination device is then activated in the dark, covered region, so to speak, an optimal image capture and/or image evaluation is possible. For example, the aforementioned enclosure device can extend as far as the guide surface of the machine tool, an opening only being present in the region of the guide surface beyond which the work tool projects relative to the guide surface in at least one operating mode or in one position of the drive unit relative to the guide surface.

The tool sensor can for example be arranged on a dusty air duct for extracting dusty air laden with particles from the machine tool. For example, the dusty air duct extends on the work tool and/or around the work tool.

Expediently, an airflow device, for example comprising one or more guide walls or guide plates or the like, is provided in the region of the tool sensor. The airflow arrangement is configured and/or arranged such that it deflects a particle flow containing particles away from the tool sensor.

The tool sensor expediently comprises or is formed by a camera. However, other sensory principles are possible, for example measurement with an optical sensor, capacitive sensor or the like. Here too, the particles can cause a certain interference.

The detection range of the tool sensor expediently covers at least 45°, preferably at least 60°, particularly preferably at least 70°. The tool sensor comprises for example a wide-angle lens.

The tool sensor is preferably arranged very near to the work tool, for example at a distance of less than 5 cm, in particular less than 4 cm or 3 cm. In this case, detection by means of a wide-angle lens is particularly advantageous.

According to a per se independent concept, also advantageous in connection with the above invention or a per se separate invention, the machine tool is provided with a soiling checking means for checking a soiling of the tool sensor by particles. The machine tool is equipped to process the tool sensor signal depending on a degree of soiling of the tool sensor and/or to output a warning, for example an optical or acoustic warning, depending on a degree of soiling of the tool sensor. For example, the soiling checking means generates a sensor signal or output signal which represents the degree of soiling. However, the soiling checking means can also be realised through the image processing or signal processing device which processes signals from the tool sensor and provides the tool sensor signal. Thus, a brightness value of the tool sensor signal can for example be adjusted, in particular by means of a histogram equalisation. If a predetermined or adjustable threshold value for the brightness is exceeded, the machine tool issues a warning, for example on a screen, by means of an LED display, by means of a signal tone, via a loudspeaker or the like.

According to a preferred concept, the soiling checking means is designed to determine the degree of soiling of at least one brightness value in the tool sensor signal and/or an output signal of the tool sensor provided in order to determine the tool sensor signal.

It is preferred if the soiling checking means comprises at least one light source, for example one or more light sources of the aforementioned illumination device or a separate light source, for illuminating a front side of the tool sensor, as well as at least one light sensor to determine a reflection from the front side of the tool sensor depending on a soiling of the front side through particles. It is advantageous if the front side of the tool sensor, for example a front side of the lens, a filter element or the like, is illuminated by the light source, for example by an LED.

The light source and the light sensor are expediently arranged in a manner corresponding to an angle of incidence and an angle of reflection relative to the front side of the tool sensor. The illumination expediently takes place below a total reflection. If, therefore, the light sensor, for example a photodiode, registers the light reflected by the front side of the tool sensor or the particles present thereon, in the case of a front side soiled by particles for example, an increased or reduced reflection can be registered by the light sensor as an indication or as a measure of the degree of soiling.

It is also possible that the illumination takes place in a colour spectrum which cannot be registered by the tool sensor or which does not interfere with detection. For example, the light source generates light within a non-visible range and/or an infrared range. Typical cameras which are advantageous as tool sensors can for example be unable to detect infrared light, so that the aforementioned brightness check by means of an infrared light source and a corresponding light sensor does not interfere with the coverage of the workpiece contact region.

A detection range of the tool sensor expediently comprises a workpiece contact region in which the work tool is in contact with the workpiece, for example a machined edge created, or being created, through the machining of the workpiece by means of the work tool, as well as a front region, viewed in a working direction. The machine tool can be guided along on the workpiece or the workpiece can be guided along on the machine tool in the working direction. For example, the work tool cuts into in the workpiece in the working direction.

It is also expedient if the tool sensor is configured and/or aligned to detect a workpiece marking arranged on the workpiece. For example, the detection range of the tool sensor is directed at a, viewed in the working direction, foremost region of the workpiece or at a machining region which is, viewed in the working direction, located before the work tool.

The detection range of the tool sensor thus advantageously comprises, on the one hand, the actual engagement region or contact region of the work tool with the workpiece, but in addition also the region in front of this, viewed in the working direction. This gives the operator an optimal control over the working operation.

Furthermore, it is expedient if the machine tool or a machine tool according to the invention is configured to provide at least one function depending on a detection of a workpiece marking arranged on the workpiece. For example, the evaluation device can be provided with an edge detection or line detection function which detects the workpiece marking. The workpiece marking is for example a scribe line, a line or the like.

The at least one function comprises for example the display of a distance of a current machined edge from the workpiece marking. The display takes place for example on a display device or on the display device, so that the operator can control how far away from the workpiece marking the current working edge of the work tool still is in relation to the workpiece.

However, an automatic concept is also possible in which the machine tool performs motory, braking or actuatory functions depending on the workpiece marking being reached. For example, the work tool can be braked on reaching the workpiece marking. An anticipatory approach is thereby advantageous, i.e. such that the machine tool already causes the drive unit to run more slowly, so to speak, if the machined edge is located in the vicinity of the workpiece marking. Furthermore, an actuating drive of the machine tool can also be provided in order to adjust the drive unit relative to the guide unit, for example an actuating drive with which the drive unit is swivelled or slid relative to the guide element. Depending on whether the workpiece marking has been reached, the machine tool, for example the evaluation device, actuates a corresponding actuating drive. For example, the work tool can be moved out of the workpiece by the actuating drive on reaching or before reaching the workpiece marking. Naturally it is advantageous if the function also comprises an actuation of the drive unit, for example an adjustment of a rotational speed of the drive motor, on reaching the workpiece marking.

It is preferred if the machine tool is provided with at least one tool sensor, in particular a camera, on a side of the work tool facing away from the drive unit, in particular the drive motor. The tool sensor is for example located on a free end face or flat side of the work tool. The work tool is so to speak arranged between the tool sensor and the drive unit, in particular its drive motor. The tool sensor is for example arranged on a cover on the enclosure of the work tool.

However, alternatively or in addition, an embodiment is also possible wherein at least one tool sensor is provided on a side of the work tool facing the drive unit, for example the drive motor. The tool sensor can thus for example be located in the dust extraction duct or in another position.

It is also expedient if the at least one tool sensor is arranged above the guide surface and/or does not project laterally beyond the guide surface. This means that the tool sensor is not in the way during machining of the workpiece. The tool sensor is thus located above a projection of the guide surface, in particular in the region of the drive unit.

It is possible that a tool sensor is fixed in relation to the guide element, i.e. is arranged on the guide element. In particular, such a tool sensor, for example a camera, is arranged in the region of a longitudinal side of the guide surface, so that its detection range is directed at the workpiece contact region.

It is further advantageous if at least one tool sensor is arranged on the drive unit, so that it follows movements of the drive unit relative to the guide element, i.e. its detection range is so to speak adjusted along with the drive unit.

Expediently, the machine tool is provided with a height measuring device for detecting a height of the workpiece, wherein the height corresponds to a distance between an upper side of the workpiece which is to be penetrated by the work tool and an underside of the workpiece opposite the upper side of the workpiece.

It is thereby a fundamental concept that the operator is so to speak able to achieve an optimal adjustment of the penetration depth of the work tool in the workpiece in that they receive information concerning a height of the workpiece. The height measuring device is installed on board the machine tool, which facilitates handling. Thus, the operator does not need to lay a yardstick or other measuring device against the workpiece in order to determine its height. Operation is convenient.

A detection of a height of the workpiece is for example advantageous in terms of achieving an optimal cut quality and/or an optimal dust extraction. Furthermore, lower machining forces, for example cutting forces, are sufficient in the case of a machine tool which is optimally adjusted in relation to the height of the workpiece.

The height measuring device is expediently configured to detect an upper workpiece edge between an end face of the workpiece and the upper side of the workpiece and/or to detect a lower workpiece edge between an end face of the workpiece and the underside of the workpiece. The end face is preferably oriented at right angles to the upper side of the workpiece and/or underside of the workpiece. It is advantageous if the height measuring device can detect both workpiece edges, namely the upper and the lower workpiece edge, though this is not necessary in all cases. This will become clear later. In order to detect a respective workpiece edge, the height measuring device is for example provided with contrast filters, median filters or other such filters in order to detect the course of an edge. For example, an evaluation device of the height measuring device is provided with a logic which can detect a straight line, that is to say a workpiece edge. Moreover, the evaluation device is preferably configured such that it only recognises lines running transversely to the working direction as workpiece edges.

The height measuring device is advantageously configured to determine the height of the workpiece in a direction or axis oriented orthogonally to an upper side of the workpiece or workpiece upper side surface and/or to an underside of the workpiece or workpiece underside surface.

Preferably, the height measuring device is positioned such that the machine tool lies on the workpiece with the largest possible section of the guide surface or, in the case of a semi-stationary machine tool, a large surface of the workpiece can lie on the guide surface if the height measuring device carries out the measurement. For example, according to a preferred embodiment a section of the guide surface extends in front of the height measuring device, with which the guide surface can be supported on the upper side of the workpiece or a guide device, for example a guide rail, lying on the upper side of the workpiece. It is also possible that the workpiece can be supported on this section of the guide surface, in particular in the case of a semi-stationary machine tool.

According to a preferred exemplary embodiment, the height measuring device is arranged on a for example rear longitudinal end region of the guide surface and a detection range, for example an optical axis, of the height measuring device is oriented in the direction of the other longitudinal end region of the guide surface. For example, the height measuring device can be arranged above the guide surface with its detection range directed obliquely downwards, in the direction of the guide surface.

The height measuring device preferably comprises at least one contactless detecting or measuring sensor or exclusively contactless detecting or measuring sensors.

In the case of the height measuring device, different measuring principles are possible, for example capacitive, inductive or other measuring principles.

However, an optical system is preferred. The height measuring device expediently comprises at least one optical sensor and/or a camera. The optical sensor could for example comprise a brightness sensor or several brightness sensors. A brightness sensor can for example be used to detect when a workpiece edge is passed over. If for example a reference marking is to be identified, it can be identified by means of the optical sensor, for example the brightness sensor, if the machine tool passes over the respective workpiece edge.

It is also expedient if the height measuring device is provided with at least one distance sensor. A distance between a sensor for detecting a workpiece edge and the workpiece can for example be determined by means of the distance sensor.

The height measuring device expediently comprises at least one reference light source for generating a reference marking on the workpiece. The reference marking is expediently particularly narrow or point-formed, in particular linear or point-formed. The reference marking can for example be detected by an optical sensor or a camera of the height measuring device in order in this way to detect a workpiece edge of the workpiece by means of a light reflection of the reference light generated by the reference light source. Thus, if for example the reference light is initially pointed past the workpiece and the workpiece and the machine tool are then moved relative to one another so that, during the course of this movement, the light from the reference light source strikes the workpiece, then this is first the case in the region of the lower workpiece edge. The height measuring device can detect the lower workpiece edge on the basis of the "first" reflection of the reference marking on the workpiece, namely in the region of the lower workpiece edge.

According to a preferred concept, the height measuring device is configured to determine the height of the workpiece on the basis of a change in direction and/or change in speed of a light reflection of the reference light generated by the reference light source in the event of a dynamic movement of the machine tool in relation to the workpiece, for example transversely to a workpiece edge of the workpiece. Thus, if the machine tool is moved relative to the workpiece, so that the side of the workpiece the height of which is to be measured is within the detection range of the height measuring device, for example in the region of the optical sensor or the camera, the reference light illuminates the side of the workpiece. The machine tool is for example moved forwards over the workpiece along a first direction, in particular a typical working direction. The light reflection of the reference light thereby runs for example from a lower workpiece edge to an upper workpiece edge of the workpiece and thereby has a second direction relative to the sensor of the machine tool which is oriented at an angle to the first direction, for example an oblique movement direction. If the light beam from the reference light source moves over the upper workpiece edge, it is so to speak continuously reflected from the workpiece surface so that the light reflection is so to speak fixed in relation to the sensor with reference to the moved system, namely the moved machine tool, i.e. it no longer exhibits any change in direction and/or relative movement. The height measuring device can then determine the height of the workpiece on the basis of this information.

Preferably, the height measuring device is configured to determine the height of the workpiece on the basis of a distance travelled by the light reflection transversely to a direction along which the machine tool is moved relative to the workpiece. For example, the height measuring device can determine the height of the workpiece on the basis of the length of the movement in the second direction as well as, advantageously, additional information, for example a table and/or an assignment function. The length of the movement of the second direction is for example stored in a sequence of images, an individual image or the like, of the height measuring device. It is possible that the height measuring device evaluates the individual images directly, without storing or buffering them, in order to determine the length of the movement in the second direction, for example as a so-called live stream. However, it is for example also possible that the machine tool determines the height of the workpiece on the basis of a relation between the movement in the first direction and the movement of the light reflection in the second direction.

It is preferred if the reference light source or the optical sensor or both are provided with an optical filter, for example a UV filter, a colour filter, a polarisation filter or the like. The optical filters are preferably matched to one another such that the optical sensor is for example optimally matched to the light colour and/or light brightness and/or polarisation of a reflection of the reference light from the reference light source. For example, extraneous light which does not originate from the reference light source is so to speak filtered out through an arrangement of two polarisation filters on the reference light source and on an optical sensor, in particular the camera, which are matched to one another. For example, interfering reflections caused by sunlight or other extraneous light can be eliminated in this way.

It is preferred if the height measuring device does not need a separate sensor and a sensor which is in any case mounted on the machine tool, for example a tool sensor, is used for the height measurement. The sensor or an individual sensor of the height measuring device is expediently formed by a tool sensor, for example a camera, an optical sensor, a capacitive sensor or the like, for detecting a workpiece contact region in which the work tool is in contact with the workpiece and/or for detecting a section of the workpiece located in front of the work tool, viewed in a working direction. Thus, the sensor can for example cover the region in which a saw blade or other work tool cuts into the workpiece. However, a coverage of the front section of the workpiece, viewed in the working direction, is also expedient. For example, a camera is directed forwards in the direction of the workpiece which is to be machined and at the same time serves as a component, or the sole component, of the height measuring device.

It is further advantageous if the height measuring device is configured to detect a machined edge formed through a machining of the workpiece by the work tool. The height measuring device can thus at the same time also detect a machined edge, for example a cut edge. Optical methods which are already advantageous in detecting a workpiece edge of the workpiece can, so to speak, continue to be used for this purpose. For example, a contrast filtering, an edge detection or the like which is in any case provided on board the height measuring device can be used to detect a machined edge.

The machine tool is expediently provided with a display device, for example a display, graphic display or the like, in particular a screen, for displaying information supplied by the height measuring device. Naturally, a simple display device, for example one or more LEDs or the like can also be provided in order to compare or display the height of the workpiece. It is also possible that the height of the workpiece is for example signalled in a manner simple for the operator to recognise using an LCD display or a segment display.

The information supplied by the height measuring device, which can be displayed on the display device, expediently comprises at least one marking indicating or representing a workpiece edge. The information can also, in particular in addition to the marking, display at least a partial region of the workpiece, for example its end face. In this way, the operator can for example recognise whether the marking which is supposed to indicate the workpiece edge is in fact an upper workpiece edge by comparing the marking with the synoptically displayed image of the workpiece. However, the information can also comprise a height specification for a height of the workpiece, for example a scale, numerical specification or the like. The marking is expediently generated by the height measuring device on the basis of a detection of the upper workpiece edge and/or the lower workpiece edge. The operator thus recognises, on the basis of the marking, whether the height measuring device has correctly detected the upper workpiece edge or lower workpiece edge and output these accordingly as a marking on the display device.

It is preferred if the machine tool is configured to determine a specified penetration depth of the work tool on the basis of the height of the workpiece determined by the height measuring device. That is to say the machine tool so to speak specifies an optimal penetration depth. The operator can adhere to this recommendation in that for example they only move the work tool into the workpiece as far as the specified penetration depth.

A servomotor-driven or semi-automatic concept is particularly convenient. An actuating drive is advantageously provided in order to adjust the drive unit relative to the guide element depending on the specified penetration depth. The machine tool is configured to control the actuating drive according to the specified penetration depth, so that the drive unit and thus the tool holder with the work tool are moved to the ideal specified penetration depth.

However, a semi-manual or manual depth setting is also possible. Preferably, the machine tool is provided with a depth adjustment device in order to set a penetration depth of the work tool in the workpiece with at least one stop element which is adjustable according to the specified penetration depth. The operator can fix the stop element on for example a mounting contour of the depth adjustment device according to the specified penetration depth. Here too, a servomotor-driven concept is possible, i.e. the stop element is for example moved by an actuating drive into a position in relation to a mounting contour of the depth adjustment device corresponding to the specified penetration depth.

A protected arrangement of the height measuring device is advantageous. The height measuring device is expediently arranged in a dust extraction region and/or beneath a covering.

So to speak mechanical markings can for example be provided in order to orient the machine tool for a height measurement of the workpiece. For example, according to one variant the height measuring device uses a marking arranged on the guide element or on a housing, in particular a drive unit, of the machine tool in order to orient the machine tool to a workpiece edge, for example the upper workpiece edge, of the workpiece. The marking is for example a linear marking, a projection, a depression or the like. It is particularly advantageous if such a marking is provided on a narrow side of the guide element. Furthermore, LEDs for example or other such light sources can be provided in the region of the marking, so that the operator is displayed a reference position in order to orient the machine tool in relation to the workpiece.

However, a marking superimposed on the display device is also suitable in order to orient the machine tool in relation to the workpiece. For example, according to one exemplary embodiment the height measuring device is configured to display an optical marking, for example a line, at least one individual point or the like, as well as a so to speak synoptical image of the workpiece edge on a display device. In this way, the operator can also align the optical marking with the displayed workpiece edge, so that as a result the machine tool is oriented in relation to the workpiece for the height measurement.

According to a preferred concept, the height measuring device is configured to dynamically detect at least one workpiece edge, for example an upper workpiece edge or a lower workpiece edge, of the workpiece during a relative movement of the workpiece and the machine tool. It is thereby preferable if the machine tool is guided along on the workpiece or the workpiece is guided along on the machine tool in that the workpiece rests on the guide surface. In particular, the upper side of the workpiece or the underside of the workpiece lies against the guide surface. The height measuring device can for example dynamically detect if the workpiece edge is in a reference position.

It is possible that the height measuring device dynamically detects both workpiece edges and, in addition, also advantageously determines a relative distance of the detecting sensor from the end face of the workpiece, so that the height measuring device determines the height of the workpiece on the basis of the relative distance and of a distance between the detected workpiece edges or of a distance between images of the workpiece edges.

The at least one tool sensor and/or the at least one position sensor is expediently a contactless sensor or comprises such a sensor.

The mobile machine tool according to the invention can for example be guided relative to the workpiece as a manually-operated machine tool. In particular, the machine tool is so light that it can be grasped by an operator and guided along on the workpiece. Such a machine tool is for example a separating machine, a saw, a milling machine, in particular a router, a plunge saw, a mitre saw, which for example has a guide rail for laying on the workpiece, a jigsaw or the like. It is also possible that the mobile machine tool is a so-called semi-stationary machine tool, i.e. a machine tool which can be transported conveniently to the location of use, for example on a construction site. In this case the machine tool is for example a mitre saw, a sliding saw, a sliding mitre saw, a bench saw or the like.

The work tool is preferably a cutting tool, for example a saw blade, a cutting disc or the like. The work tool can be an elongated saw blade, for example for an oscillating saw, in particular a jigsaw, or a circular saw blade. Furthermore, the work tool can also be a milling tool, drilling tool or the like.

BRIEF DESCRIPTION OF THE DRAWINGS

Exemplary embodiments of the invention are explained in the following with reference to the drawing, wherein:

FIG. 3 shows a view of the machine tool according to FIGS. 1, 2, viewed obliquely from above, FIG. 4 shows the machine tool according to the preceding figures viewed from the side and from obliquely below, wherein a cover has been removed, FIG. 5 shows a detail of an illumination device of the machine tool according to the preceding figures, FIG. 35 shows a schematic representation of a detection range of a tool sensor of the machine tool during detection of a rear cut edge or machined edge, viewed in the working direction, FIG. 36 shows progressions of pixels relative to a position signal of a position sensor of the machine tool, in particular in connection with the representation according to FIG. 35, FIG. 37 shows a progression of optically displayed cut edges on the display device of the machine tool, FIG. 38 shows a schematic detail view illustrating a height measuring of a workpiece.

DETAILED DESCRIPTION

Figure 1:
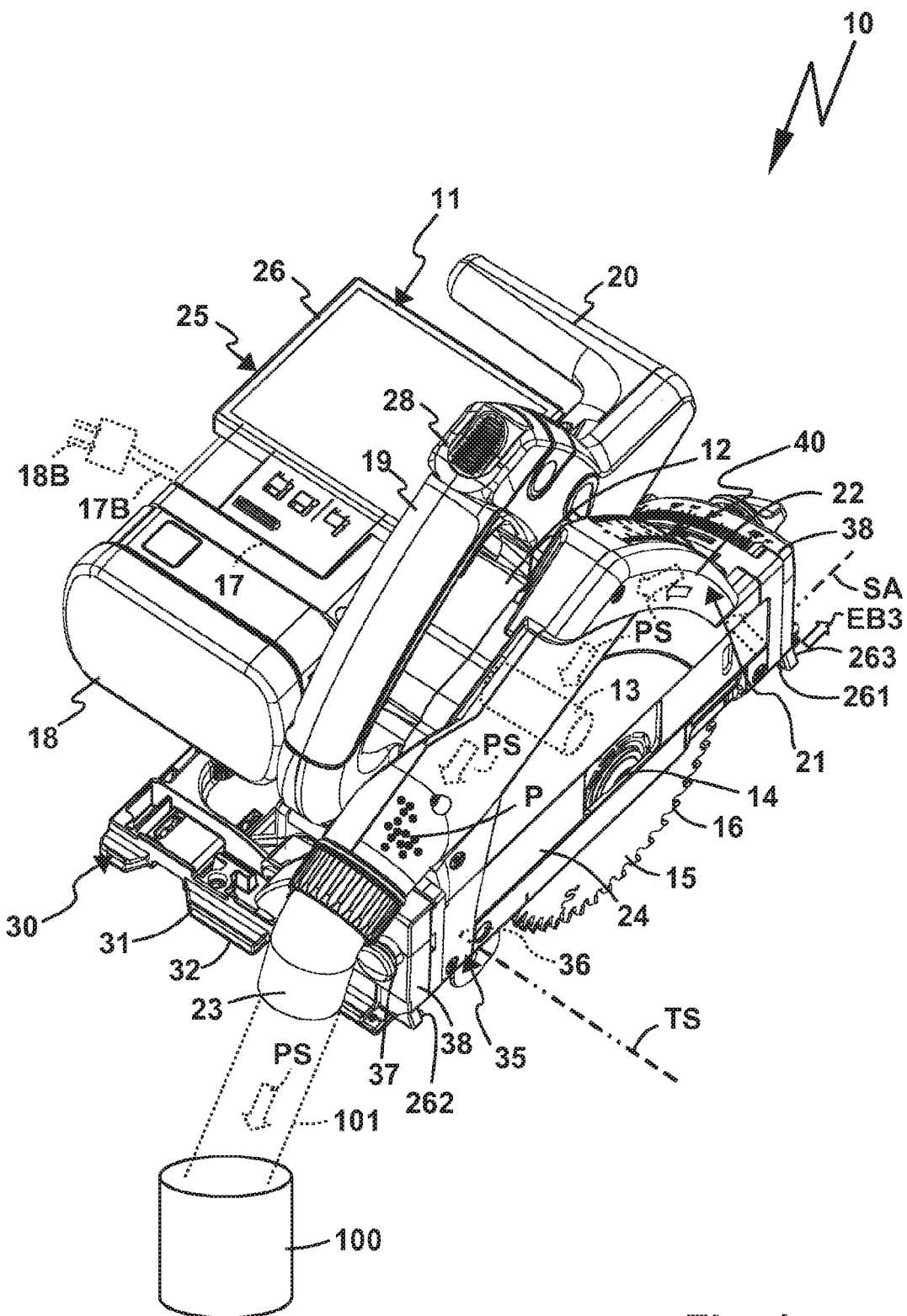
FIG. 1 shows an oblique perspective view of a machine tool, viewed obliquely from the rear, which is shown in FIG. 2 in an oblique frontal perspective view.
Figure 6:
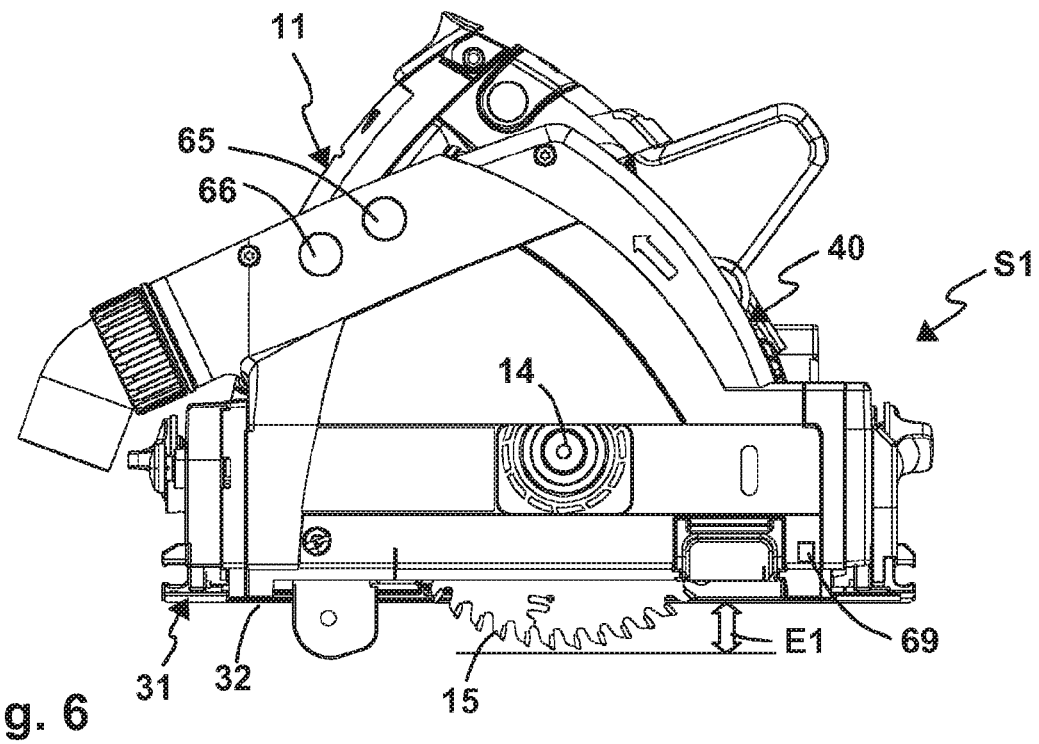
FIG. 6 shows a side view of the machine tool according to the preceding figures in a central adjustment position.
Figure 7:
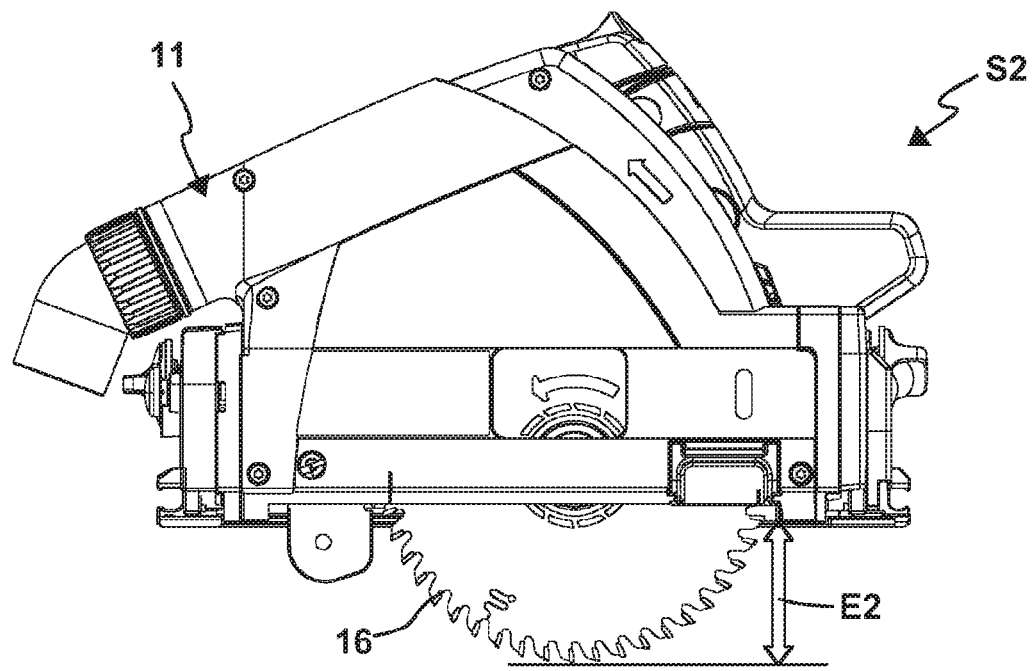
FIG. 7 shows the view according to FIG. 6, wherein however the machine tool occupies a lower adjustment position.
Figure 8:
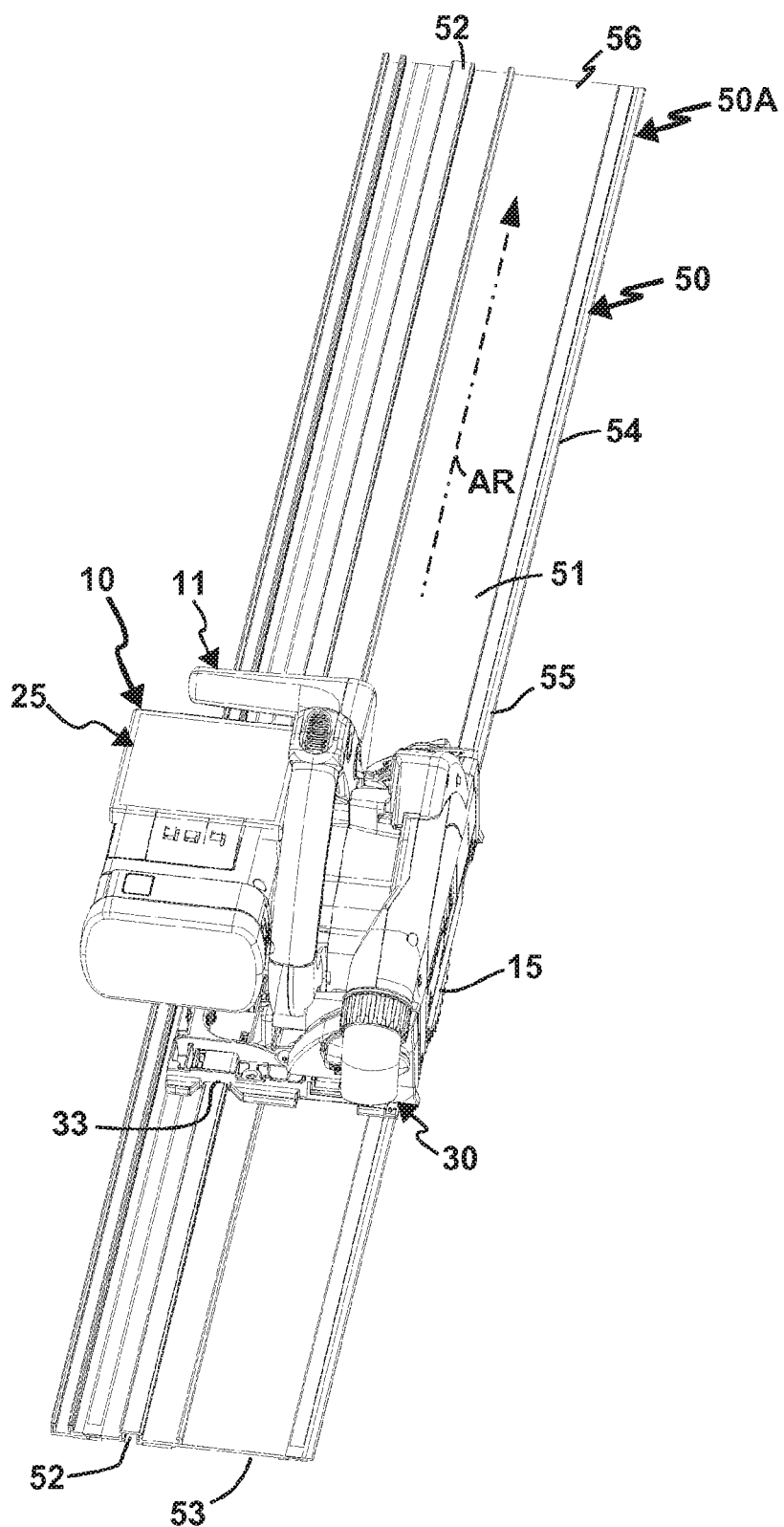
FIG. 8 shows a perspective view of the machine tool according to the preceding figures as well as a guide rail for same.

A machine tool 10 is for example configured as a sawing machine. In particular, the machine tool 10 is a plunge saw.

The machine tool 10 has a drive unit 11 with a machine housing 12 in which a drive motor 13 is housed. The drive motor 13 drives a tool holder 14 directly or via gears, not shown in the drawing. In the drawing, a work tool 15 is fastened, or in any case detachably fastenable, onto the tool holder 14. The work tool 15 comprises for example a saw blade or other cutting tool. It should be mentioned at this point that the exemplary embodiment also stands for other machine tools of mobile type, i.e. for example hand-guided cutting machines, routers or the like.

The machine tool 10 is mobile, i.e. it can be supplied with power via a power supply connection 17. The drive motor 13 is an electrical drive motor, wherein, alternatively, a pneumatic or other drive motor is readily conceivable. The power supply connection 17 comprises for example a mains cable 17B, on which a plug 18B for plugging into a mains supply, for example a 110V or 230V alternating current supply, a direct current supply or the like is arranged. However, in this specific embodiment the mains cable 17B is to be understood as an option, i.e. the machine tool 10 can be cordless or operable without a mains cable, i.e. the power supply connection 17 comprises for example plug contacts, which cannot be seen in the drawing, which allow an energy store 18, in particular a so-called rechargeable battery pack, to be connected detachably. The energy store 18 supplies the machine tool 10 with electrical energy. This makes the machine tool 10 optimally mobile.

A handgrip arrangement for gripping the machine tool 10 is arranged on the drive unit 11. This facilitates the handling of the machine tool 10. The handgrip arrangement comprises for example an upper handgrip 19 as well as a front handgrip 20, viewed in a working direction AR. The operator can thus grasp the handgrips 19, 20 and so guide the machine tool 10 along a workpiece W in the working direction AR, as well as adjusting it if necessary into an inclined position in relation to a guide element 30.

The work tool 15 is at least partially housed beneath a protective cover or enclosure device 21. In particular if the drive unit 11 assumes an upper adjustment position S0 or basic position in relation to the guide element 30, the work tool 15 is substantially completely accommodated beneath the enclosure device 21.

The enclosure device 21 also forms a boundary of a dust extraction duct 22, which so to speak extends around the upper section of the work tool 15 or the section of the work tool 15 which is enclosed within the enclosure device 21. The dust extraction duct 22 ends in an extraction connection 23, to which for example a suction device 100 or other extraction device can be connected. For example, a suction hose 101 can be connected to the extraction connection 23 which connects the extraction connection 23 with the suction device 100 with respect to a flow, i.e. it establishes a flow connection.

The dust extraction duct 22 and/or the enclosure device 21 are covered by a cover 24. The cover 24 is removable, as can be seen for example in FIGS. 3 and 4.

A display device 25, by means of which the functions of the machine tool 10 can be monitored and/or controlled, is located on an upper side of the machine tool 10 or the drive unit 11 facing the operator. For example, the display device 25 comprises a display 26, in particular a screen. The display 26 can be monochrome, but also multicoloured. In particular, the display 26 contains numerous graphically controllable picture elements or pixels. The picture elements or pixels are for example arranged next to one another in an X-direction and above one another in a Y-direction and are in particular individually controllable.

By means of an electrical drive switch 27, the operating element of which is visible in the drawing, the drive motor 13 can be switched on and off and also, in particular, adjusted with respect to its rotational speed. The operating element or the drive switch 27 are located on an upper section of the handgrip 19 facing the operator, so that if they grasp the handgrip 19 the operator can for example operate the operating element 27 with their index finger.

As is also ergonomically favourable, an operating element 28 for a depth adjustment device 40 is located near the handgrip 19. The operating element 28 can be used to unlock the depth adjustment device 40, so that the drive unit 11 can be moved out of the adjustment position S0 into adjustment positions S1 and S2, which are illustrated by way of example.

The guide element 30 forms for example a saw bench. The guide element 30 is plate-like. For example the guide element 30 comprises a guide plate 31. A guide surface 32 is provided on the underside of the guide element 30 facing away from the drive unit 11 with which the machine tool 10 can be guided along an a underlying surface, for example the workpiece W or a guide rail 50. The guide surface 32 is preferably a flat surface.

Depressions and/or a guide groove 33 into which a guide projection 52 of the guide rail 50 can engage can be provided on the guide surface 32. Naturally, the kinematic reverse is possible, i.e. that a guide projection is provided on the guide element 30 in order to engage in a depression of the guide rail 50 (not illustrated).

The drive unit 11 can be adjusted in relation to the guide element 30 by means of a bearing arrangement 35, which is in the present case swivelable. However, a sliding displacement would also readily be possible in order to adjust different depth adjustment positions or adjustment positions S0-S2. This should for example be realised in this way in the case of a router with corresponding guide columns.

The bearing arrangement 35 comprises in particular a depth adjustment bearing 36. The depth adjustment bearing 36 is located at the rear, viewed in the working direction AR, whereby a depth adjustment bearing located at the front, viewed in the working direction, is also readily possible in the case of an embodiment of the machine tool 10 as a pendulum hood saw or as a combined pendulum hood-plunge saw. The adjustment positions S0-S2 as well as adjustment positions between these can be adjusted by means of the depth adjustment bearing 36.

Furthermore, a mitre position or swivel position of the drive unit 11 in relation to the guide element 10 can be adjusted, for which purpose a tilt bearing 37 is provided. The tilt bearing 37 comprises bearing elements 38 which, viewed in the working direction AR, are arranged at the front and rear on the drive unit 11 as well as on the guide element 30. The drive unit 11 is arranged between the bearing elements 38.

The drive unit 11 can be swivelled around a depth adjustment axis TS by means of the depth adjustment bearing 36. The drive unit 11 can be adjusted in relation to a tilt axis SA in relation to the guide element 30 by means of the tilt bearing 37, in particular the mitre bearing. The tilt axis SA runs parallel to the working direction AR, the depth adjustment axis SA runs transversely, in particular at right angles to working direction AR.

The operator can specify a desired depth adjustment on the machine tool 10 by means of a depth adjustment device 40. The depth adjustment device 40 comprises a mounting contour 41, for example on an upper side or front side of the enclosure device 21, configured as a guide. The guide or mounting contour 41 further comprises a scale 42 on which the operator can read a respective depth adjustment position or adjustment position S0-S2 as well as intermediate positions.

A stop element 43 is mounted moveably on the guide or mounting contour 41, which the operator can fix in the desired depth adjustment position or adjustment position S0-S2. For example, a snap-locking device or clamping device is provided on the stop element 43, that is to say a fixing device 44 by means of which the stop element 43 can be fixed in different depth adjustment positions on the guide or mounting contour 41. For example, an operating element 45 is provided on the stop element 43 by means of which the fixing device 44 can be switched from a snap-locking position and/or clamping position into a release position in which the stop element 43 is adjustable in relation to the guide or mounting contour 41. In a respective depth adjustment position of the stop element 43, a stop 29 on the drive unit 11 comes to rest against the stop element 43, so that the respective adjustment position S0-S2 or depth adjustment position can be adjusted in this way.

The guide rail 50 forms a guide device 50A for guiding the machine tool 10 along a working direction AR.

The guide rail 50 has an upper side 51 along which the guide element 30 can slide. The guide projection 52 projects in front of the upper side 51, for example in the manner of a guide rib. The guide rail 50 has an elongated form, so that the machine tool 10 can be guided along the longitudinal extension of the guide rail 50 and thus in the working direction AR. This makes possible, in a known manner, particularly exact and straight saw cuts in the workpiece W.

An underside 53 of the guide rail 50 is intended to rest on the workpiece W or other underlying surface. A narrow side 54 of the guide rail 50 past which the work tool 15 can be moved in the direction of the workpiece W extends laterally, i.e. transversely to the longitudinal extension of the guide rail 50. An upper edge 55 extends between the upper side 51 and the narrow side 54. The operator can thus move the machine tool 10 positioned on the guide rail 50 comfortably from the longitudinal end 56 of the guide rail 50 up to its longitudinal end 57.

The machine tool 10 is provided with a sensor arrangement 60 which comprises a plurality of sensors. For example, tool sensors 61, 62 in the form of cameras are provided. The tool sensor 61 is arranged at the front, viewed in the working direction AR, the tool sensor 62 is arranged at the rear, viewed in the working direction AR, in relation to the work tool 15. The tool sensors 61, 62 serve to cover partial workpiece contact regions WK1, WK2, in which the work tool 15 is in contact with the workpiece W, for example cutting into the workpiece W.

Both tool sensors 61, 62 are so to speak arranged in the dust chamber or dirt chamber of the machine tool 10, namely in the region of the enclosure device 21. This has the advantage that, apart from the typical dust intake or other soiling, the tool sensors 61, 62 are not exposed to environmental influences. In particular, the tool sensors 61, 62 can be arranged optimally in relation to their respective image recognition, which will be explained later.

The dust extraction via the extraction connection 23 in itself already ensures that the detection ranges or measurement regions of the tool sensors 61, 62 are blown largely free of particles P which are produced during the machining of the workpiece W by the work tool 15. Nonetheless, even in the case of an optimal particle extraction or dust extraction, particles P, in particular chips, dust or the like, are present in the detection ranges of the tool sensors 61, 62 which can adversely affect or even prevent the capture of an image. In order to counter this problem, optimisation means OPT are provided which are intended to reduce, or preferably eliminate, the effects of the particles P present in the detection ranges of the tool sensors 61, 62 on a tool sensor signal from these tool sensors 61, 62.

The optimisation means OPT comprise for example a suitable angular arrangement of optical axes of the tool sensors 61, 62 in relation to an illumination of the detection ranges of the tool sensors 61, 62.

An optical axis O1 of the tool sensor 61 runs for example at an angle of approx. 60-90° in relation to the guide surface 32. The tool sensor 61 is configured and/or intended to cover the work tool 15 in particular in a roughly tangential manner. A direction of view or an orientation of the detection range of the tool sensor 61 is for example indicated in FIG. 18.

An optical axis O2 of the rear tool sensor 62, viewed in the working direction AR, is likewise oriented at a steep angle in relation to the guide plane 32 and thus also roughly tangentially in relation to the work tool 15. The tool sensor 62 serves to detect a rear cut edge which is created when the work tool 15 cuts into a workpiece W.

The tool sensors 61, 62 are located so to speak in a dark space. They are substantially covered by the enclosure device 21. The detection ranges of the tool sensors 61, 62 are thus located in a space protected against the influences of extraneous light, in particular if the guide surface 32 rests on the workpiece W.

However, the tool sensors 61, 62 do not need to be highly sensitive or suitable for low-light environments, but can achieve an optimal detection performance. To this end, an illumination device 70 is provided which comprises several light sources 71, 72 as well as an arrangement of several light sources 73 in a row, i.e. a light source arrangement 73.

In order to adapt the brightness of the illumination device 70, for example to a brightness of the environment of the machine tool 10, the illumination device 70 can for example be provided with a brightness sensor 69 with which a brightness of an environment of the machine tool 10 can be registered.

The light source 71 and the light source arrangement 73 are assigned to the tool sensor 61. The light source 71 and the light source arrangement 73 in each case illuminate the work tool 15 from opposite sides in the region of a workpiece contact region, namely of a region in which the work tool 15 cuts into the workpiece W.

The light source 72 is assigned to the tool sensor 62 and illuminates the detection range of same.

In principle, reflections and mirroring or the like could occur when the illumination device 70 is switched on. However, in order to reduce if not actually prevent a negative influence of the illumination device 70 on the image quality or detection quality of the tool sensors 61, 62, the optical axes O1 and O2 of the tool sensors 61, 62 are oriented at wide angles in relation to the main light axes or light beam axes of the light sources 71-73.

For example, the light beam axis or main axis L1 of the light source 71 is oriented at an angle W12 to the optical axis O1 of the tool sensor 61 in a plane parallel to the guide surface 32 and at an angle W11 in a plane vertical to the guide plane or guide surface 32. The angles W11 and W12 are angles of more than 90°, so that for example the light emitted by the light source 71 strikes particles P which are produced during the machining of the workpiece W by the work tool 15 at an angle to the optical axis O1. As a result, the particles P are not illuminated in the optical axis O1 of the tool sensor, in particular the camera 61, so that they appear less bright in the image captured by the tool sensor 61 or do not interfere with the image.

The light beam axis or main axis of the light sources 73A, 73C of the light source arrangement 73 is also oriented at an angle to the optical axis O1, for example roughly at right angles, corresponding to an angle W3 (FIG. 3).

A similar angled orientation, at least in relation to a plane parallel to the guide surface or guide plane 32, is also provided in relation to the tool sensor 62 and the light source 72, for example at an angle W2 between the optical axis O2 and the light beam axis or main axis L2 of the light source 72. The angle W2 amounts for example to at least 30 or 40°.

According to a further measure improving the image quality, the light from the illumination device 60 is as far as possible emitted in a diffuse and non-directed manner. For example, the light sources 71 and the light source arrangement 73 are in each case arranged behind diffusing elements 74, 74. This is naturally also advantageous in the case of the light source 72. The diffusing elements 74, 75 comprise for example diffuse lenses, matte lenses or the like.

It is also advantageous for the detection of for example a front machined edge or a front edge of the work tool 15, as can be seen in FIG. 5 in particular, that the illumination takes place from opposite sides of the work tool 15. In this way, unfavourable hard shadows are avoided. Thus, one can see from FIGS. 3-5 an optimal illumination concept which significantly improves the image quality of the image signals generated by the tool sensors 61, 62.

Further advantageously, the sensor arrangement 60 is provided with further sensors, for example a position sensor 63 which is assigned to the depth adjustment device 40. The position sensor 63 can for example detect a respective position of the stop element 73 in relation to the guide or mounting contour 41.

A further position sensor 64 is for example arranged on the depth adjustment bearing 36, so that it can register the respective angular position of the drive unit 11 in relation to the guide element 30.

The sensor arrangement 60 expediently also comprises a tilt sensor 65 which can specifically register an angular position or tilt of the drive unit 11 relative to the guide element 30. The tilt sensor 65 could also be formed by a correspondingly adjusted or selected acceleration sensor 66 which registers an acceleration of the drive unit 11 or the machine tool 10. The acceleration sensor 66 can for example register an acceleration of the drive unit 11 in the direction of the guide surface 32 if the drive unit 11 swivels around the depth adjustment axis TS. Furthermore, the acceleration sensor 66 can register an acceleration parallel to the guide plane or guide surface 32, so that an advance of the machine tool 10 relative to the underlying surface or workpiece W can be detected by means of the acceleration sensor 66.

Furthermore, the machine tool 10 can also be provided with other tool sensors, in particular tool sensors which are arranged next to one another in a row direction or row arrangement. By way of example, further tool sensors 161, 162, in particular optical sensors, advantageously cameras, are provided on the cover 24 or on the opposite side of the drive unit 11 from the cover 24. A saw cut SN which the machine tool 10 cuts into the workpiece W can be monitored even more precisely by means of the tool sensors 161, 162.

However, tool sensors can also be provided outside of the dust extraction chamber, i.e. outside of the enclosure device 21, for example tool sensors 261, 262, which are in particular arranged directly next to the bearing elements 38 on the guide element 30. The detection ranges of the tool sensors 261, 262, which are advantageously formed by cameras but which can also realise other sensory concepts, are for example directed frontally onto the work tool 15 from the front and from the rear.

It is advantageous if a tool sensor oriented in the working direction AR is provided which is so to speak oriented forwards in the direction of view towards the workpiece. For example, a detection range EB3 of a tool sensor 263 (FIG. 1) is oriented forwards, viewed in the working direction AR. The tool sensors 261, 263 can be arranged on the same mounting element, one tool sensor 261 being oriented rearwards, viewed in the working direction AR, towards the work tool 10, the other tool sensor 263 being oriented forwards, viewed in the working direction AR.

An optimal concept for reconciling a machined edge or several machined edges actually created in the workpiece W by the work tool 15 and the position signal POS of the position sensor 63 is explained in the following with reference to FIGS. 9-17. The position sensor 63 comprises for example a resistance measuring strip which is arranged on the guide 61 and influenced by the stop element 43. However, alternatively or in addition, an optical detection, a distance measurement or the like of the stop element 43 relative to the guide surface 32 is possible.

Figure 9:
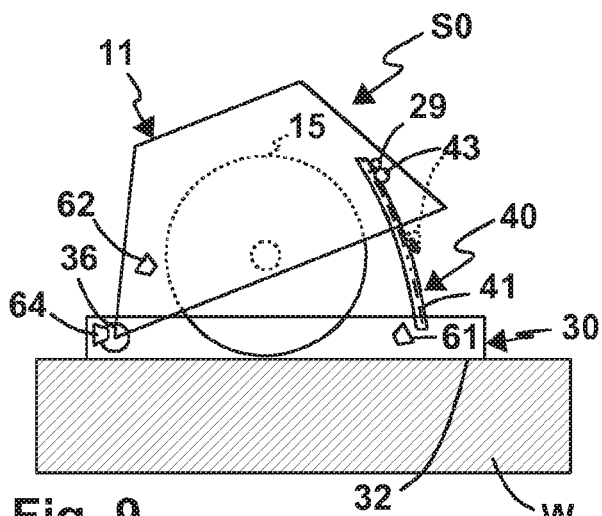
FIG. 9 shows the machine tool in an upper adjustment position in relation to its guide element, in schematic representation.
Figure 10:
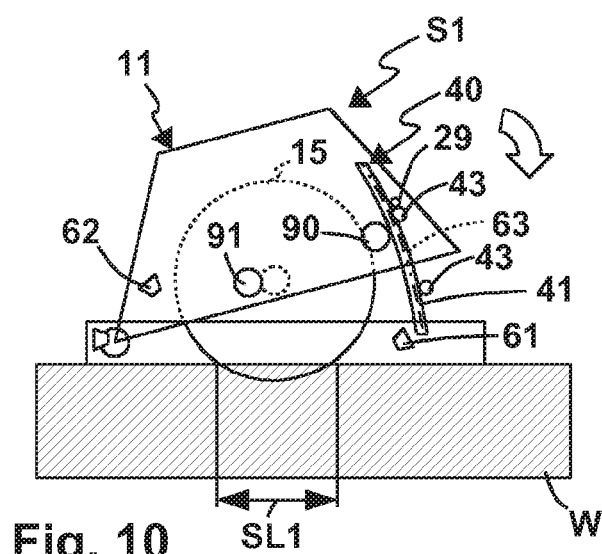
FIG. 10 shows the view according to FIG. 9, but with the drive unit roughly in the adjustment position according to FIG. 6.

Starting out from the adjustment position S0 (FIG. 9), the drive unit 11 is adjusted, via one or more intermediate positions S1, into the lower adjustment position S2 (FIG. 11) in which the work tool 15 cuts to a maximum extent into the surface of the workpiece W and/or projects in front of the guide surface 32. In the adjustment position S0 the stop 43 is for example still in the uppermost position (FIG. 9). As yet, no saw cut has been displayed on the display device 25. Nonetheless, the tool sensor 61, 62 can also already represent certain working regions, which for reasons of simplification is not illustrated in the drawing. The workpiece W is also still unmachined, i.e. according to FIG. 15 it has a uniform "undamaged" surface.

Figure 11:
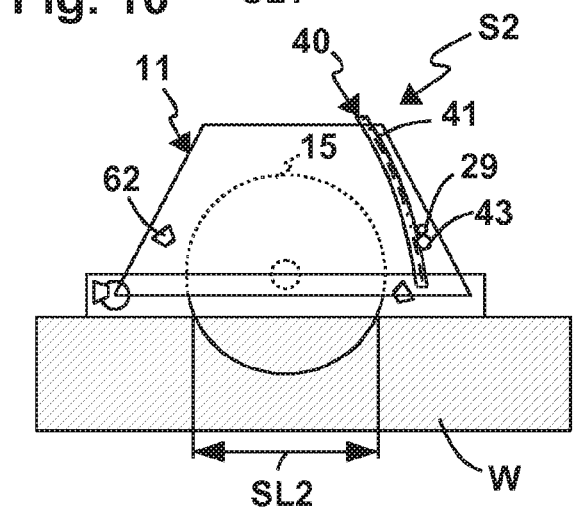
FIG. 11 shows a view of the machine tool according to FIGS. 9, 10, wherein the drive unit occupies an adjustment position roughly as shown in FIG. 7, FIGS. 12-14 show a display device of the machine tool according to the preceding figures in the adjustment positions shown in the FIGS. 9-11, FIGS. 15-17 in each case show a workpiece being machined by the machine tool in the adjustment positions according to FIGS. 9-11 and the cutting line thereby formed.

If the drive unit 11 is swivelled around the depth adjustment axis TS, the stop 29 carries with it the stop element 43, as long as it is not yet fixed on the guide or mounting contour 41, until it reaches the lower position illustrated in FIG. 11. At the same time the position signal POS output by the position sensor 63 changes.

In the adjustment position S1 (FIGS. 10, 13, 16), a saw cut SN which is cut into the workpiece W by the work tool 15 extends between a front machined edge KV1 and a rear machined edge KH1. The saw cut SN hat a cut length SL1. The position sensor 64 outputs an actual position signal IST1 and IST2 for the two machined edges corresponding to the front and rear cut edges KV1, KH1. However, in an illustrated lower position of the stop element 43 as shown in FIG. 11, the drive unit 11 can assume the target adjustment position S2 (if the stop element 43 is adjusted to its lowest position/FIG. 11), which is indicated on the display device 25 by target markings SO1 and SO2 for the front and rear cut edges KV and KH.

During the further adjusting movement around the swivel axis TS, the actual markings IST1 and IST2 converge until they coincide with the target markings SO1 and SO2. The saw cut SN then has a cut length SL2 and extends from its front cut edge KV2 to its rear cut edge KH2.

Figure 18:
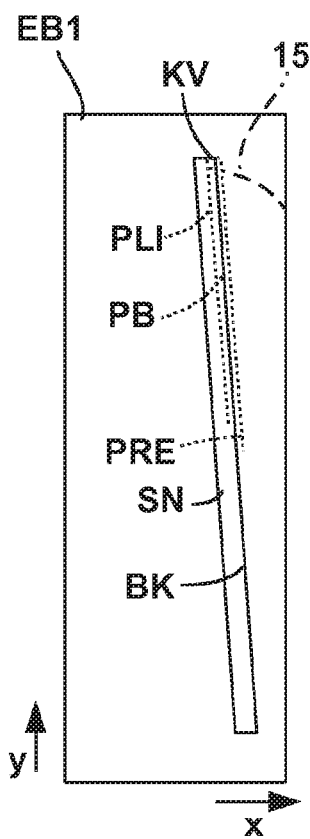
FIG. 18 shows a schematic representation of a detection range of a tool sensor of the machine tool during detection of a front cut edge or machined edge, viewed in the working direction

The illustration according to FIGS. 9-17 is thus based on an optimally adjusted configuration which however needs to be "calibrated" beforehand. This is made more clear in the following with reference to FIGS. 18-20:

FIG. 18 shows schematically a detection range EB1 of the tool sensor 61. Within the detection range 61, an evaluation device 80 of the machine tool 10 identifies for example a test region PB within which the front machined edge KV is to be determined. The front machined edge KV or cut edge is cut by the work tool 15, which is indicated schematically. It should be mentioned at this point that during operation, i.e. if it is driven by the drive motor 13, the work tool 15 in any case appears out of focus, for which reason the broken line 15 also represents the relatively not clearly recognisable work tool 15. In any case the front machined edge KV is formed, which is only identified by the evaluation device 80 within the test region PB. In the image according to FIG. 18 the machined edge KV lies slightly in front of the outer circumference of the work tool 15, which appears out of focus in the image. The image according to FIG. 18 is very close to reality, because one can see that that the front machined edge KV is only very small or narrow within the detection range EB1 or test region PB. The greater part of the machined edge KV is covered by the work tool 15, i.e. it cannot be detected by the tool sensor 61.

Preferably, the test region PB is substantially limited to the region of the front machined edge KV.

It will be made clearer in the following with reference to FIG. 19 how an adjusted depth adjustment position of the drive unit 11 relative to the guide element 30 is so to speak calibrated or assigned on the basis of the position signal POS of the position sensor 63. The positions of display pixels on the display device 25 are entered on an axis SP, the position signal POS of the position sensor 63 on an axis POS. If the stop element 43 of the stop 29 is carried along during a plunging movement or adjusting movement of the drive unit 11 relative to the guide element 30, i.e. moved in the direction of the guide surface 32 (see FIGS. 9-11), the position signal POS increases so to speak. At the same time the pixels of the machined edge KV are determined as position values PX and PY.

Figure 20:
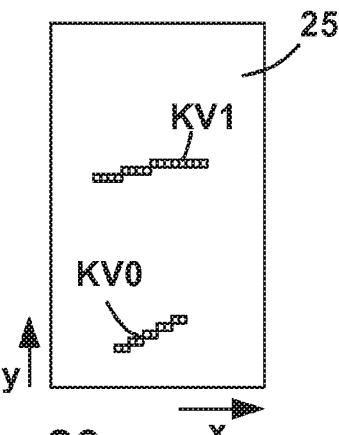
FIG. 20 shows a progression of optically displayed cut edges on the display device of the machine tool in connection with the representation according to FIG. 18.

To illustrate this more clearly, the result is significantly exaggerated in FIG. 20. For example, the cut edge or machined edge KV0 runs relatively obliquely just as the work tool 15 cuts into in the workpiece W. For example, an ideal path or an ideal orientation of the machined edge KVO would be substantially horizontal or in the X-direction if the tool sensor 61 is optimally oriented and the movements run more or less parallel. The machined edge KVO moves in the Y-direction during the creation of the saw cut. In the adjustment position S1, the machined edge KV1 is formed which already runs significantly more horizontally than the machined edge KVO or its image on the display device 25.

An analogous procedure is also readily possible on the basis of the signal of the position sensor 64 in order to detect the swivel position or adjustment position of the drive unit 11 relative to the guide element 10.

Figure 19:
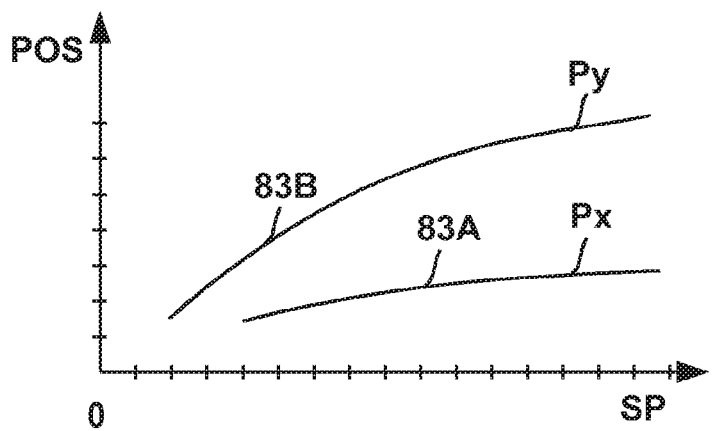
FIG. 19 shows progressions of pixels relative to a position signal of a position sensor of the machine tool in connection with the representation according to FIG. 18.
Figure 21:
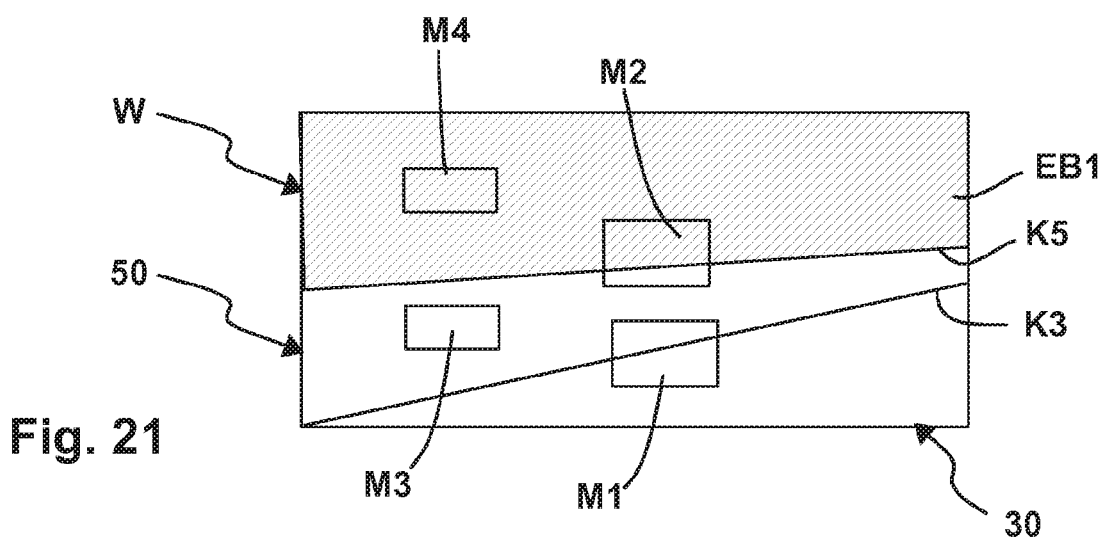
FIG. 21 shows a schematic representation explaining a detection of the guide rail shown in FIG. 8.
Figure 22:
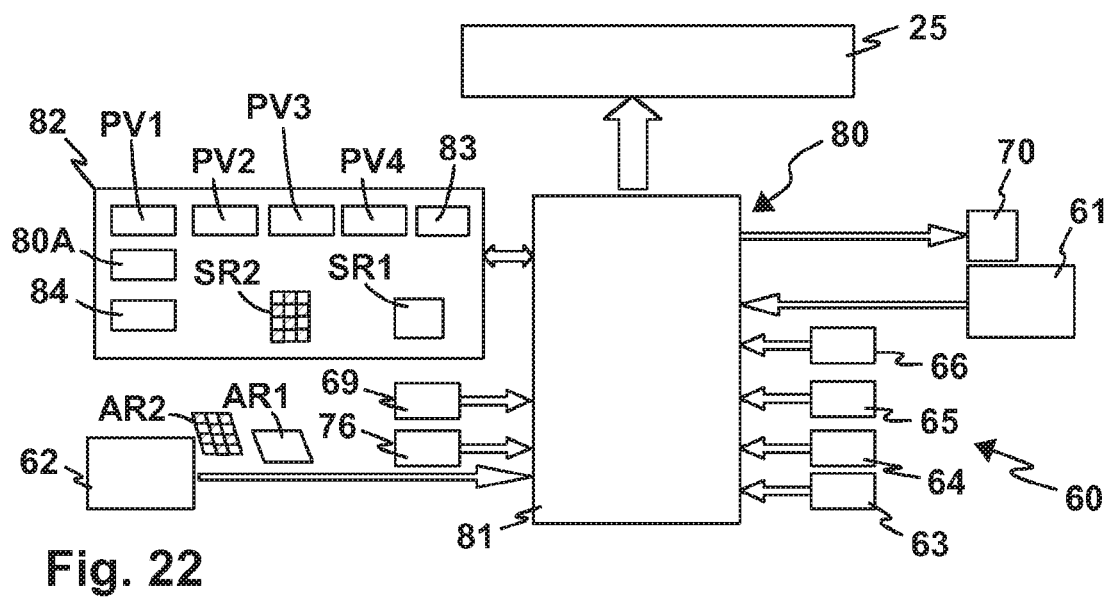
FIG. 22 shows a schematic circuit diagram of the machine tool with a processor.

In FIGS. 35-37, the situation in the region of the rear machined edge KH is illustrated in a manner comparable with the representation according to FIGS. 18-20 showing the front machined edge KV. It can be seen that the rear machined edge KH so to speak wanders downwards to the rear within the test region, likewise referred to, for the sake of simplicity, as the test region PB, (FIG. 35). Accordingly, developments of the machined edge KH, starting out from a machined edge KH0 immediately following cutting into the workpiece W up to the machined edge KH1 in the adjustment position S1, are represented on the display device 25.

The evaluation device 80 is also configured to determine whether the machine tool 10 is being operated with or without a guide rail 50 in that the aforementioned calibration is expediently carried out once with a guide rail 50 and once without a guide rail 50, so that any tolerances which result from the position of the guide element 30 in relation to the guide rail 50 and/or the guide rail 50 itself are determined, so that an optimal display of a respective target position S01 and SO2 is possible with and without guide rail 50. If the calibration according to FIGS. 19 and 20 is carried out, the operator can adjust the stop element 43 to a desired sawing depth or machining depth. The respective target markings SO1 and SO2, which represent the machined edges which result if the drive unit 11 is adjusted as far as the stop element 43, appear on the display device 25. The operator can then line up the target markings SO1 and/or SO2 with a workpiece marking MA, for example on the surface of the workpiece W, so that the plunge cut or saw cut is exactly limited or ends where the displayed marking SO1 and SO2 is displayed by the display device 25. This makes possible a particularly exact and precise machining of the workpiece.

It is thus advantageous if the guide rail 50 is detected by the tool sensor 61, 62 and/or the evaluation device 80.

Measuring fields M1-M4 are for example provided in order to ensure reliable detection of the guide rail 50, for example in the detection range EB1 of the front tool sensor 61, viewed in the working direction. In the measuring fields M1 and M2, the evaluation device 80 registers for example an edge K3 between the guide element 30 and the guide rail 50, in the detection range M2 it registers the edge of the guide rail 50 in relation to the underlying surface, for example the narrow side 54 or the upper edge 55. The edge K3 can for example be identified through a contrast measurement and/or by means of an in particular gradient-based edge filter. The contrast between the guide rail 50 and the workpiece W is likewise used in order for example to identify the edge K5. Preferably, the edge K5 is determined with reference to the edge K3 or starting out from the edge K3.

However, it would also be sufficient to identify one of the edges. For example, the presence of the guide rail can be identified by means of another measurement or sensory detection, in particular an optical detection of unique features of a guide rail, for example its structure, colour, longitudinal extension or the like.

In addition, in order to make the measurement so to speak particularly reliable, a contrast measurement is also carried out with the measuring fields M3 and M4 in order to determine the contrast between guide rail 50 and workpiece W, which serves as an indication that the machine tool 10 is not resting on a workpiece W which has more or less the brightness of a guide rail.

However, a measurement in individual measuring fields is not essential. For example, the intelligent evaluation device

80 can for example determine that a long edge, for example the edge 55, is present, in order in this way to conclude the presence of the guide rail 50. If, in addition, a contrast measurement or a colour measurement or both is also carried out on both sides of the already identified guide rail edge K5, and these colours or contrasts are compared with one another (according to the measurement in the fields M4 and M3), this makes it possible to detect reliably that the machine tool 10 is actually standing on the guide rail 50 and not on a workpiece.

Figure 23:
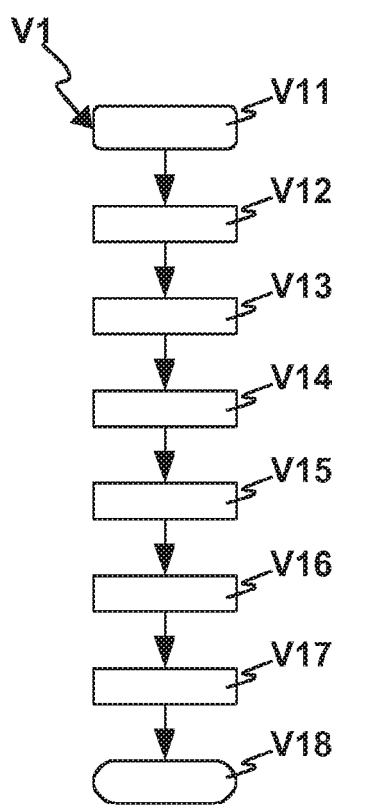
FIG. 23 shows a flow chart representing the generation of for example the information according to FIGS. 19, 20.
Figure 24:
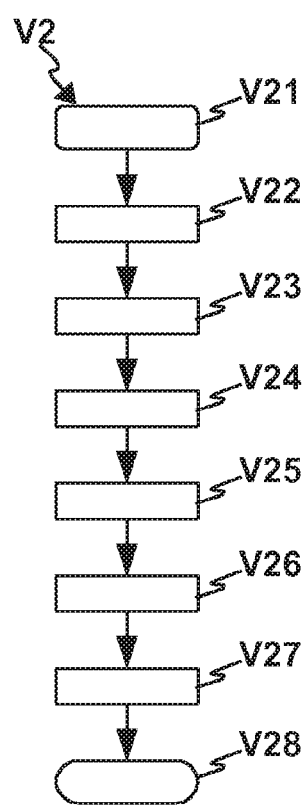
FIG. 24 shows the sequence of an image processing in the case of a machined edge detection according to FIG. 18.
Figure 25:
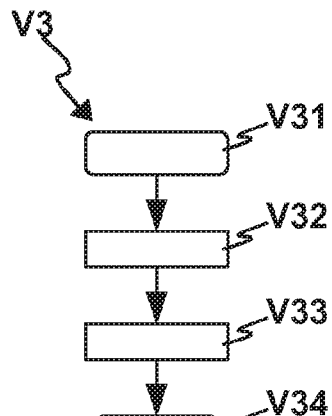
FIG. 25 shows a flow chart in connection with the specification of a target position of the drive unit of the machine tool relative to its guide element.
Figure 26:
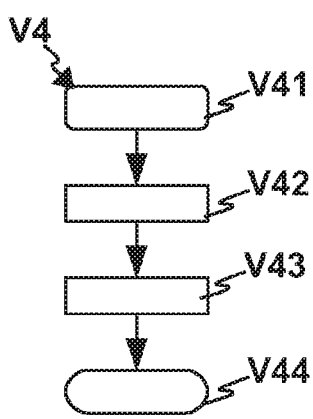
FIG. 26 shows a flow chart representing the output of an actual relative position of the drive unit relative to the guide element.
Figure 29:
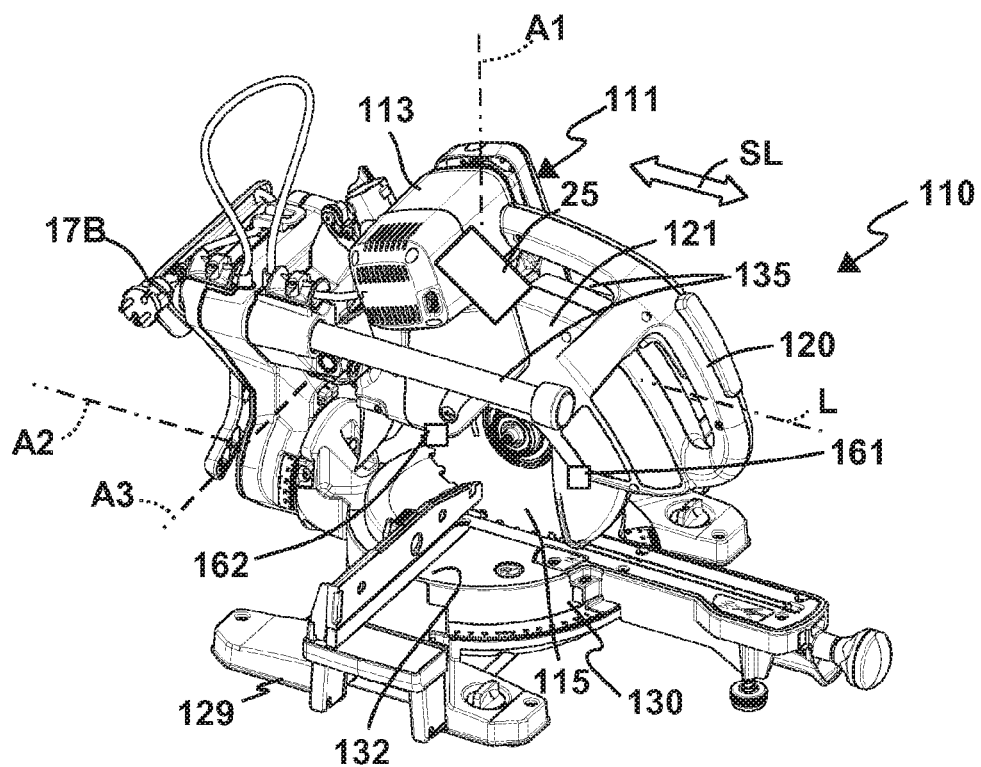
FIG. 29 shows an alternative exemplary embodiment of a machine tool according to the invention in the form of a semi-stationary machine tool.

A method V1 for determining assignment values on the basis of the position sensor signal POS, as well as the machined edge detection according to FIG. 18, is presented with reference to FIG. 23.

The method begins starting out from an initial method step V11 in which for example a user selects a calibration. In the step V11 the user selects the calibration for example because a saw blade or work tool and/or the guide rail has been exchanged.

In a method step V12 it is for example first determined whether or not the machine tool 10 is standing on the guide rail 50.

In a method step V13 the stop element 43 is coupled, for example snap-locked, clamped or the like, with the stop 29, so that a plunging movement or adjusting movement of the drive unit 11 at the same time results in an adjustment of the stop element 43.

In an optional step V14, the position sensor 64 determines a current angular position on the depth adjustment bearing 63.

In a method step V15, the position sensor 63 determines the respective position of the stop element 43, i.e. the adjusted depth.

In a method step V16, the individual machined edges according to FIG. 18 are displayed by the evaluation device 80. In a method step V17, the respective position sensor values POS as well as the values PX, PY determined through the cut edges or machined edges are stored. In this way, the evaluation device 80 can for example store a corresponding assignment table 83 in a memory 82. However, alternatively or in addition, the evaluation device 80 can also generate mathematical assignment functions 83A, 83B from the values POS, PX and PY, for example a third degree polynomial, fourth degree polynomial or the like. A number of position values PX, PY and POS thus suffice in order to generate corresponding polynomials or other mathematical assignment functions 83A, 83B. The accuracy of the mathematical assignment functions 83A, 83B increases with an increasing number of available position values PX, PY and POS.

Preferably, an averaging and/or a weighting of the position values is carried out in order to determine the assignment function 83A and/or 83B. Preferably, the least squares method is used in order to determine the assignment function 83A and/or 83B.

The step V18 represents the end of the method V1. However, the method steps V27 and/or V28 of the method V2 described in the following could also be realised in the step V18.

The evaluation device 80 can follow a similar procedure for the rear machined edge KH and thereby for example generate mathematical assignment functions 183A, 183B on the basis of position values PxH and PyH.

If the work tool 15 is removed from the workpiece W, the localisation of the test region PB can for example take place as follows. It should thereby be taken into consideration that for example the position of the saw cut SN and thus for example its right-hand machining contour BK, viewed in the working direction AR, for example an elongated sawn edge, changes in relation to the tool sensor 61, 62, i.e. the camera, depending for example on the height of the guide rail 50, the width of the work tool or saw blade 15, the geometry of teeth or other cutting contours of the work tool 15 and the like. For example, the saw cut SN is first made in the workpiece W. The evaluation device 80 then detects the machined edge BK and, depending on the development and the orientation of the machined edge BK in the detection range EB1, determines a left-hand limit PLI, viewed in the working direction AR, and a right-hand limit PLR, viewed in the working direction AR, between which the machining contour BK of the test region PB is located.

The method V1 is preferably then carried out.

The image processing or edge detection according to FIG. 18 can for example take place by means of the method V2 explained in the following.

In the method V2, the image captured by the tool sensor 61 is for example, in a method step V21, first converted into a greyscale image, and in a method step V22 modified by means of a filtering or compensation processing, for example a Gaussian filtering, median filtering, bilateral filtering, averaging filtering or the like.

In a method step V23, the test region PB is determined or masked.

In method step V24, a threshold method is applied, i.e. the greyscale image already generated in step V21 is for example converted into a binary image. For example, the workpiece surface thereby appears white, the cut edge or machined edge black.

The method steps V21, V22 and V24 comprise for example digital filters.

One or more of the method steps V21, V22 and V24 represent for example a component of the optimisation means OPT.

A method step V25 stands for an edge detection in the image generated in step V24.

In a method step V26, the values PX and PY are determined in that for example the corresponding light and dark pixels in the image obtained in the method step V25 are analysed.

In an optional method step V27, the curves PX and PY (FIG. 19) are determined, for example the aforementioned polynomials.

Not only in connection with the method V2, but quite generally in connection with the invention, it is advantageous if confirmation queries take place, namely such that only positions of cut edges which are actually present are stored as pixel positions, so that for example outside influences are ruled out. Such outside influences can for example be dust, chips or other such blurring or foreign bodies.

Furthermore, when registering an edge in terms of the invention it is advantageous if the plausibility of the edge is recognised or analysed for example on the basis of neuronal networks or the like. A neuronal network can for example be trained in advance for this purpose.

The assignment table 83 and/or the assignment functions 83A, 83B are for example generated in a method step V28.

The sequence of the method steps V21 and/or V22 and/or V23 and/or V24 can also be different. Also, in some cases individual method steps are not necessary. For example, the test region PB, method step V23, can be determined first before the method steps V21, V22 are carried out.

The information obtained in the methods V1 and V2 can be used in the methods V3 and V4.

For example, in a step V31 of the method V3 the user can set a corresponding plunge depth by moving the stop element 53 into the desired position. In a method step V32, the evaluation device 80 determines whether or not a guide rail 50 is present.

In a method step V33, the position sensor 63 measures the position adjusted by means of the stop element 43.

In a method step V34, the adjusted target position S01, SO2 is displayed on the display device 25. At this point it becomes clear that the method according to FIGS. 18, 19, 20 is carried out not only in connection with the front tool sensor 61, but also with the rear tool sensor 62, so that a front and rear target machined edge is displayed to the operator on the display device 25.

The method V4 stands for the display of an actual adjustment position of the drive unit 11 relative to the guide element 30. The adjustment operation of the drive unit 11 relative to the guide element 30 begins in a method step V41. In a method step V41 the position sensor 64 measures the respective swivel position or adjustment position of the drive unit 11 relative to the guide element 10.

In a method step V43, the evaluation device 80 determines, for example on the basis of the assignment table 83 or the curves PX, PY according to FIG. 19, the actual position occupied by the drive unit 11 relative to the guide element 10, or which machined edge results in the current position.

The method step V44 represents the end of the method V4. In this method step, the markings IST1 and/or IST2 are for example displayed.

The methods V1-V4 are carried out by the evaluation device 80. The methods V1, V2, V3, V4 are for example realised by means of program modules PV1, PV2, PV3, PV4 which contain program code which can be executed by the processor 81, wherein the methods V1-V4 are carried out on execution of the program code.

A certain imprecision can arise as a result of the installation of the tool sensors 61, 62, through an impact load on the machine tool 10, in particular due to being dropped or the like, in that for example the tool sensor signals from the tool sensors 61, 62 generate an unfavourably oriented image for the display device 25. It has already been mentioned in connection with FIG. 20 that for example the machined edges should as such be displayed parallel to the Y-direction, but can be oriented obliquely in the image. It is also important that for example the test region PB can be detected reliably. It is for example advantageous if the test region PB is oriented exactly or as exactly as possible on the long cut edge created when the tool 15 plunges into the workpiece surface, i.e. in the Y-direction, so that incorrect information can be avoided or reduced during calibration.

Advantageous measures are provided for this purpose:

For example, a reference marking R1 is provided in the region of the guide element 30 which can serve to orient the detection range or the displayed image area of the tool sensor 61 and/or 62.

It is firstly assumed that the cameras or tool sensors 61, 62 are already intrinsically calibrated, so that optical errors, for example wide-angle errors or the like, curvatures which result from the optics of the tool sensors 61, 62 etc. are already "eliminated". Thus, with reference to a reference marking R2 the tool sensor 61, 62 can so to speak determine its position and/or orientation in space or the evaluation device 80 can determine the position of the tool sensor 61, 62 within the installation space of the machine tool 10. This makes possible for example a so-called extreme calibration of the tool sensor 61, 62.

It can be seen that the reference pattern R2 is for example a checkerboard pattern, the lines of which converge or diverge, or in any case assume a particular angular position, depending on the perspective. This is the basic position for the determination of the spatial arrangement of the optical axis O1 or O2 of the respective tool sensor 61, 62 by the evaluation device 80. Also suitable as reference pattern is for example a so-called data matrix pattern, a radial geometrical pattern or the like. The evaluation device 80 simply needs to know the undistorted geometry (path of edges, length of edges and the like) of the respective reference pattern.

However, in simple cases an orientation on a straight line or on a two-dimensional marking can also suffice, for example on a side edge of the guide plate 31 or on the reference marking R1.

A further reference marking R3 is for example represented by a side edge or edge line (RM1) of the guide element 30 and/or an outer edge (RM2) of the work tool 15. It can be seen in FIG. 27 that the reference marking R3 lies inclined at angle within the detection range EB2, i.e. inclined at angle in relation to an X-axis XE and a Y-axis YE of the detection range EB2. However, as such the reference marking R3 or the line R3 should run parallel to the working direction AR. In order to prevent the operator of the machine tool 10 from being irritated by this, the evaluation device 80 ensures correct orientation of an image of the detection range EB2 and/or EB1 on the display device 25. The evaluation device 80 determines for example the orientation of the reference marking R3 in relation to the X-axis XE and/or Y-axis YE and corrects the orientation of the reference marking R3 so that it runs parallel to the Y-axis YE. An image corrected in this way is shown by way of example in the display device 25 in FIG. 3. Naturally, the evaluation device 80 can in addition also carry out a rectification of such an image of an detection range EB1 or EB2 on the display device 25 so that for example the reference marking R1 and/or R2 are represented with lines running parallel or at right angles to the reference marking R3. However, in FIG. 3 this rectification is only carried out for the reference marking R2, not for the reference marking R1. One can see the correspondingly distorted representation of the reference marking R1 compared with the reference marking R2.

A further possibility for evaluating the reference markings R1 and/or R2 is for example possible on the basis of stored images SR1 and SR2 of the reference marking R1 and R2. The evaluation device 80 can compare the stored images SR1 and SR2 with images AR1 and AR2 captured by the tool sensors 61, 62 in order in this way to determine one or more correction values, to carry out a rectification or the like. For example, a rectification function or rectification table determined for rectification of the so to speak real images AR1 and AR2 can be used by the evaluation device 80 to rectify further images which are represented by the sensor signals from the tool sensors 61 and 62 and for example show the work tool 15 or the like. The images SR1 and SR2 can for example be stored as program code or stored information in an evaluation program 80A which can be executed by the processor 81 or, as illustrated in the drawing, stored in the memory 82. If stored in the memory 82 it is possible to load the images SR1 and SR2 into the memory 82 as parameter data.

Figures 27, 28:
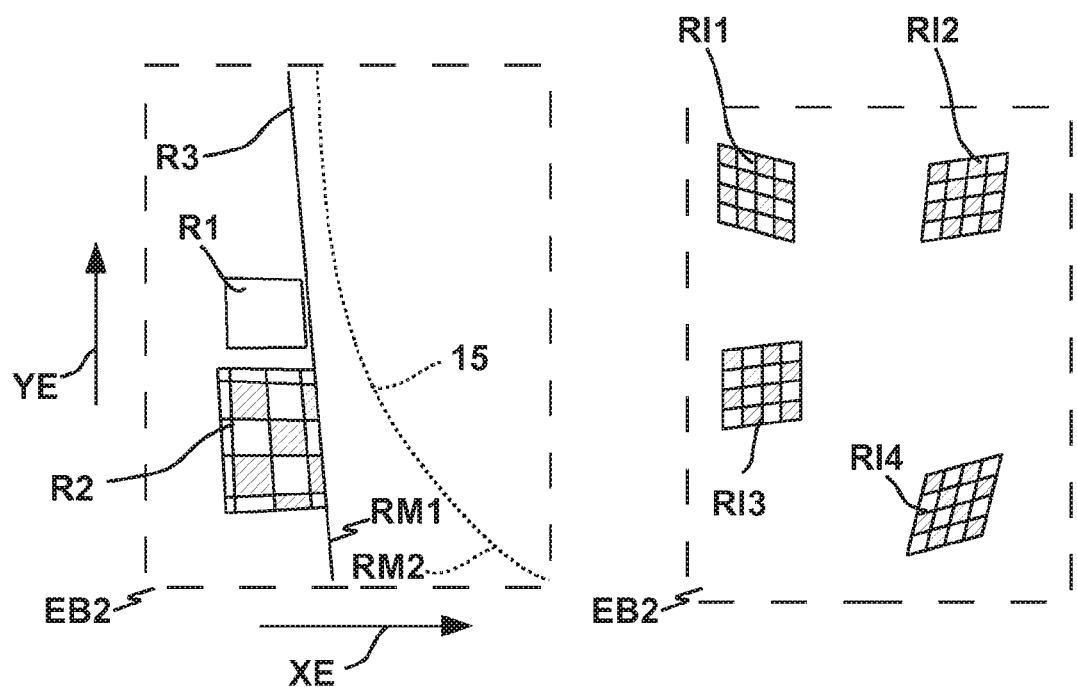
FIG. 27 shows a detection range of a tool sensor of the machine tool with reference markings.
FIG. 28 shows an arrangement of reference markings for an intrinsic calibration of the tool sensor of the machine tool.

An intrinsic calibration of the tool sensors 61, 62 is explained with reference to FIG. 28. The tool sensors 61, 62, which are for example already installed in the machine tool 10 can, with their detection ranges, register reference markings RI1, RI2, RI3 and RI4, for example if their detection range is directed through the opening of the enclosure device 21 for the work tool 15. In this case the machine tool 10 is brought into several positions relative to the reference markings RI1-RI4, wherein the evaluation device 80 registers the respective reference markings RI1-RI4 and in particular their position and distortion in space. The evaluation device 80 can then intrinsically calibrate the tool sensors 61, 62 or evaluate their tool sensor signal so to speak in an intrinsically calibrated manner.

In the drawing, the detection ranges EB1 and EB2 are substantially represented with respect to their orientation. The detection range EB2 of the tool sensor 62 has a significantly narrower angle than the detection range EB1. For example, the detection angle of the tool sensor is twice as wide or even greater than the detection range EB2 of the tool sensor 61.

That is to say the tool sensor 61 is so to speak a wide-angle sensor. The tool sensor 61 comprises so to speak a wide-angle camera.

Figure 12:
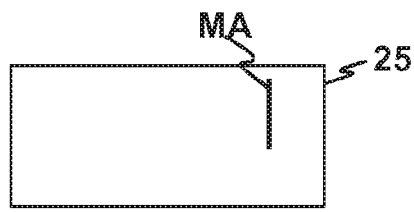
Figure 15:
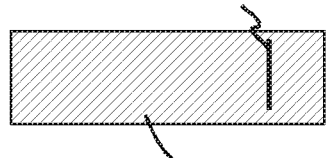
Figure 16:
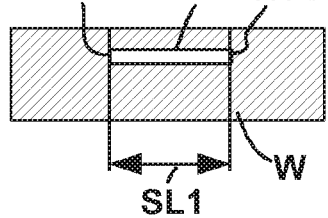
Figure 17:
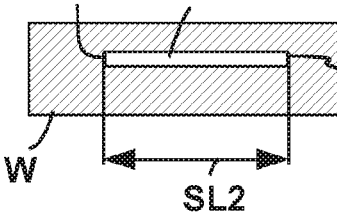

This arrangement makes it possible that the tool sensor 62 not only covers the region in the direction of the front machined edge KV, but can also for example detect and display a workpiece marking MA on the workpiece W, as is indicated in the FIGS. 12 and 15. The workpiece marking MA is omitted in the FIGS. 13, 14, 16 and 17 for reasons of simplification, but is nonetheless displayed by the display device 25.

The operator can orient himself on the workpiece marking MA, for example lining up the target line SO1 with the workpiece marking MA, so that the position of the front machined edge KV2 is optimally defined. However, an automatic or semi-automatic concept is also advantageous. For example, a difference information DI can be displayed on the display device 25 which indicates a current distance between the actual machined edge, in particular the marking IST1 (FIG. 13) and the target machining position SO1 and/or the position of the workpiece marking MA. In this way, the operator easily recognises the progress of work and can for example reduce the rotational speed of the drive motor 13 and/or reduce the advance speed of the manually-operated machine tool 10 in relation to the workpiece W accordingly before reaching the front machined edge KV1 and or the workpiece marking MA.

However, an automatic or semi-automatic concept is particularly favourable. For example, the evaluation device 80 controls the drive motor 13 and/or an actuating drive 90 and/or a brake 90 in such a way that the machining of the workpiece W ends on reaching, or before reaching, the workpiece marking MA. For example, the evaluation device 80 can, by means of the aforementioned image processing steps, in particular an edge detection, grey value formation and the like, detect the line of the marking MA. If the work tool 15 is in the location of the workpiece marking MA, i.e. the front machined edge KV1 reaches the workpiece marking MA, the evaluation device 80 can for example shut off the drive motor 13. Alternatively or in addition it is advantageous if at the same time a brake 91 is activated by the evaluation device 80, so that the tool 15 stops as quickly as possible. Moreover, in addition or alternatively, an actuation of an actuating drive 90 is also expedient, which the evaluation device 80 actuates for example in order to exchange the work tool 15 or remove it from the workpiece W if the machined edge KV reaches the workpiece marking MA.

The concept according to the invention, which has already been explained, can be realised not only in the case of mobile machines which can be moved or guided relative to the workpiece, but also in the case of semi-stationary machines, for example in the case of a machine tool 110. The machine tool 110 has a drive unit 111 with a drive motor 113 which serves to drive a tool holder 14 for a work tool 115, for example a saw blade. The drive unit 11 is adjustable relative to a machine base 129 which can be placed on an underlying surface. For example, a guide element 130, for example a rotary table, is mounted on the machine base 129 so as to be rotatable around an axis A1. The axis A1 extends horizontally in relation to a guide surface 132 of the guide element 130. Furthermore, a tower-like structure 134 from which guide rails or guide elements 135 project is provided on the guide element 130. The guide rails or guide elements 135 allow a longitudinal adjustment or sliding adjustment SL along a sliding axis A2, so that the saw blade or work tool 115 can so to speak be moved in a linear manner along a workpiece W resting on the guide surface 132.

In addition, the work unit 111 can be swivelled around a swivel axis A3, so that the work tool 115 penetrates into the workpiece to different depths.

The operator can for example grip the drive unit 11 by a handgrip 120 and move it in relation to the guide element 130 in relation to one or more of the axes A1-A3.

The machine tool 110 can also be provided with a display device 25 which for example displays sensor signals or tool sensor signals from tool sensors 161, 162 which are arranged on opposite sides of the work tool 15, preferably within or beneath an enclosure device 121 for the work tool 15. Accordingly, actual machined edges or target machined edges can likewise be displayed on the display device 25.

It is thereby possible that, in the case of an advance movement along the axis A2, first a rear image section generated by the tool sensor 162, then a front image section generated by the tool sensor 161 are displayed on the display device 125. In this case a time condition is decisive, i.e. for example such that on switching on the drive motor 113 the image section generated or supplied by the tool sensor 162 is first displayed on the display device 125.

The same principle is also advantageously applied in the case of the machine tool 10, so that image sections which are or can be generated on the basis of the tool sensor signals from the tool sensors 61, 62 are displayed, for example controlled by a switchover device 84.

For example, the switchover device 84 comprises or is formed by a corresponding program module which contains program code which can be executed by the processor 81.

Furthermore, the switchover device 84 can determine, for example by means of the tilt sensor 65 and/or the acceleration sensor 66, whether the tool signal of the tool sensor 61 or the tool signal of the tool sensor 62 is to be displayed on the display device 25. Furthermore, the switchover device 84 can for example display the tool signals from the tool sensors 61, 62 on the display device 25 according to a time condition, for example in alternating succession at the beginning of an operation, first displaying the tool signal of one tool sensor, then that of the other tool sensor or the like.

Finally, it is also advantageous if a manual operating element 76, for example a pushbutton, a brightness sensor which can be operated by the operator or the like is provided and/or configured to actuate the switchover device 84 so as to switch between the tool signals of the tool sensors 61 and 62.

It should be mentioned at this point that the display device 25 can be equipped with or can be configured as a touch-sensitive display device, for example a so-called touch-screen. The operator can generate control commands for the machine tool 10 by selecting a predetermined field or region of the display device 25 and/or through a predetermined operating gesture, for example a swiping movement or the like. The operator can for example generate a control signal for actuation of the switchover device 84 on the display device 25, so that this displays, for example simultaneously, both tool signals from the tool sensors 61 and 62 or only one of these.

When the work tool 15 cuts into the workpiece W, the tool sensor signal of the tool sensor 62 is preferably displayed first, in the event of a subsequent advance movement, which can be detected by the acceleration sensor 66 or also the tilt sensor 65 through a corresponding detection of the depth adjustment position S1, S2 or the like, the tool sensor signal of the tool sensor 61 is then displayed, so that the front machined edge is displayed to the operator. However, a time-based control is also possible such that when the machine tool 10 is put into operation the signal of the tool sensor 62 is displayed first then, following a predetermined or adjustable time, the signal of the tool sensor 61.

Functions of a height measurement are explained in more detail in the following with reference to the FIGS. 30-34. A height measurement has great advantages in particular in connection with a display of an expected machined edge, since it is advantageous if the work tool 15 penetrates into the workpiece W to an optimal penetration depth, wherein the height of the workpiece should be known for this purpose. The optimal penetration depth is adjustable on the depth adjustment device 40 or adjustable by means of the actuating drive 90. If the machined edge or expected machined edge resulting from the respective depth adjustment or relative position of the drive unit 11 relative to the guide element 30 is then also displayed on the display device 25 or so to speak also automatically monitored in that for example the actuating drive 90 or the brake 91 is operated, a concept which is convenient for the operator is achieved.

The height measurement of the machine tool 10 is explained in the following in different variants:

A height measuring device 95 of the machine tool 10 uses for example the rear tool sensor 62. It can be seen that the detection range of the tool sensor 62 is optimally directed at a rear end face of the workpiece W, viewed in the working direction, so that an upper workpiece edge WKO and a lower workpiece edge WKU lie within the detection range of the tool sensor 62. The machine tool 10 is thereby supported on the workpiece W with a large part of the guide surface 32, so that the corresponding height measurement of the height measuring device 95 takes place under optimal boundary conditions.

Figure 31:
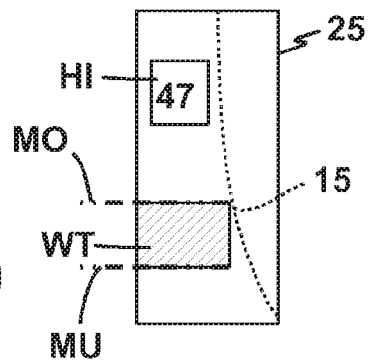
FIG. 31 shows a display device of the machine tool according to FIG. 30 with image information supplied by the height measuring device.

In connection with the height measurement, the image shown in FIG. 31 is for example superimposed on the display or display device 25, in which the operator sees on the one hand the work tool 15, at least as an outline, but preferably in real form, but on the other hand also at least a partial image WT of the workpiece W, for example the end face WS as well as a partial section of the upper side of the workpiece WO and the two workpiece edges WKU, WKO. In addition, the operator is expediently displayed markings MO and MU for the upper workpiece edge WKO and the lower workpiece edge WKU on the display device 25.

Figure 13:
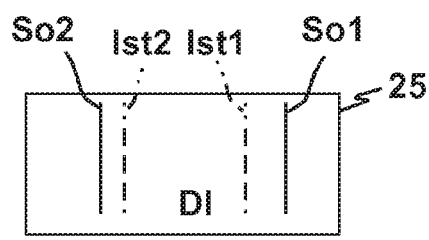
Figure 14:
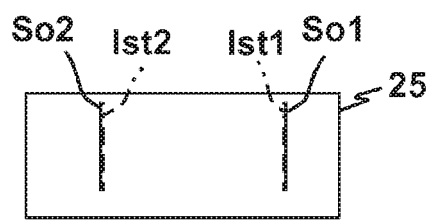

The height measurement by means of the height measuring device 95 can take place in different ways:

In a first variant, the machine tool 10 is for example oriented such that the marking MO for the upper workpiece edge WKO is lined up with the real displayed image of the workpiece W according to FIG. 13. The height measuring device 95 can then detect the lower workpiece edge WKU, for example on the basis of a contrast measurement or other such measures, and superimposes the marking MU. It is thereby assumed that a measuring angle MW at which the camera or the tool sensor 62 so to speak views the upper workpiece edge WKO or at which the tool sensor 62 is oriented in relation to the upper workpiece edge WKO if the marking MO coincides with the image of the workpiece W displayed in the image on the display device 25. The measuring angle MW is provided between a parallel plane PL parallel to the guide surface 32 and a beam which extends between the upper workpiece edge WKO and the tool sensor 62. The same angle MW is also present between a measuring plane ME and the end face WS of the workpiece W. There is thus a linear connection between a height H, for example the height H1 in FIG. 32, and a distance dx1 in the measuring plane ME, for example corresponding to a number of pixels on the display device 25. This becomes particularly clear through a comparison of FIGS. 32 and 33. In the case of the workpiece W1 illustrated in FIG. 32, a height H1 is present which is manifested as a distance dx1 in the measuring plane ME. In contrast, in the case of the workpiece W2, which has a height H2, a correspondingly shorter distance dx2, which is proportional to the height H2, is present between a beam extending between the tool sensor 62 and the lower workpiece edge WKU and the beam which is assigned to the upper workpiece edge WKO.

The respective workpiece height is expediently displayed on the display device 25 as a height specification HI, in particular in numerical values. For example, in the case of the height specification HI in the drawing, a height of the workpiece W of 47 mm is displayed.

According to an alternative measuring principle, the height measuring device 95 is first, or in a first step, oriented on the lower workpiece edge WKU in order to measure the height of the workpiece. This can for example be effected in that the operator positions the machine tool 10 correspondingly on the workpiece W or, in the case of an automatic method, in that in an first step the height measuring device 95 detects the lower workpiece edge WKU on a relative movement of machine tool 10 and workpiece W.

The manual orientation of the machine tool 10 and of the workpiece W in relation to the lower workpiece edge WKU has the advantage that the operator can locate the as a rule difficult-to-detect lower workpiece edge WKU himself with his precise eye, because as a rule a lower contrast is to be observed in the case of the lower workpiece edge WKU, namely between the workpiece and the environment.

In contrast, the height measuring device 95 has it easier, so to speak, when it comes to detecting the upper workpiece edge WKO. For example, a higher contrast is to be observed in the region of the upper workpiece edge WKO. The contrast is for example created in that the workpiece edge is illuminated from the machine tool 10, in particular by means of the illumination device 70. Furthermore, the height measuring device 95 can filter out any wood grain or other transverse structures present on the workpiece end face WS as non-valid structures which do not represent a workpiece edge, because the so to speak last transverse contour beneath the guide surface 32 can be unequivocally identified as the upper workpiece edge.

Figure 34:
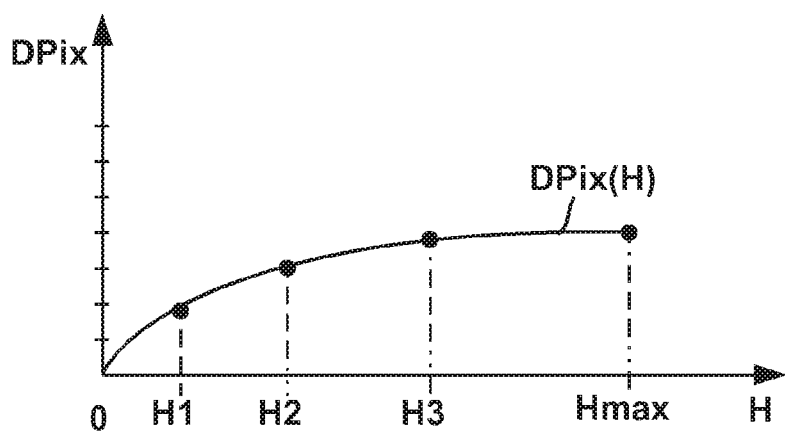
FIG. 34 shows a diagram of a progression of a number of pixels in relation to a workpiece height, wherein the number of pixels can be displayed on the display device according to FIG. 31.

However, in the case of this method there is no linear connection, but the progression indicated in FIG. 34. Here, a pixel distance DPIX between the lower workpiece edge WKU and pixels representing the upper workpiece edge are shown on the display device 25 in the case of different workpiece heights H1, H2, H3 as well as HMAX.

On this basis the evaluation device 80 can for example plot a curve DPIX (of H), i.e. a pixel distance depending on a workpiece height. For example, the operator sets down reference workpieces, one after another, on the guide surface 32 in order to determine the curve DPIX(H). The height measuring device can for example then superimpose on the display device 25 the markings MO and MU analogous to the workpiece height. However, the curve DPIX (of H) is expediently already pre-programmed or otherwise stored.

However, instead of orienting the machine tool 10 with reference to the optical marking MO it is also conceivable that the operator orients a so to speak mechanical or physical marking 96, for example a line marking on the guide element 30, on the upper workpiece edge WKO.

The aforementioned methods are so to speak static, i.e. the operator orients the machine tool 10 on the workpiece W in order to measure its height. Significantly simpler are the measures explained in the following, in which the operator simply needs to move the machine tool 10 and the workpiece W relative to one another and the height measuring device 95 so to speak automatically determines the height H of the workpiece W.

Figure 30:
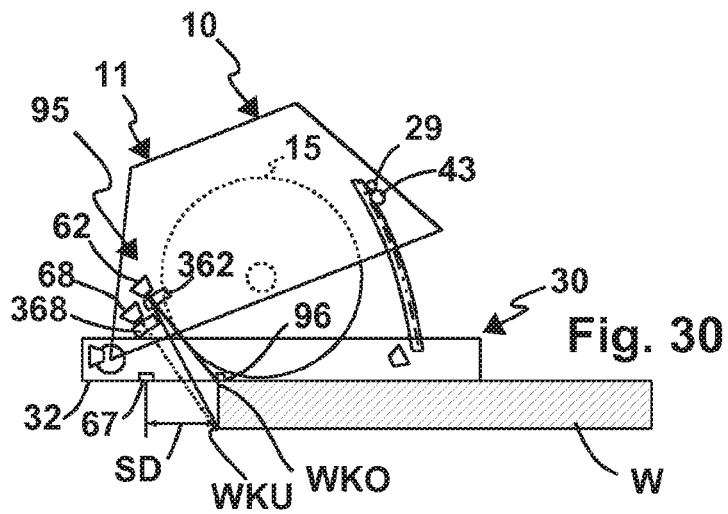
FIG. 30 shows a schematic view of the machine tool according to FIGS. 9-11 with a height measuring device.
Figure 32:
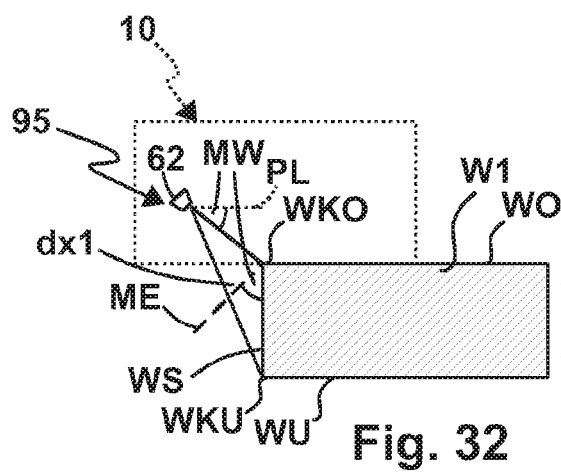
FIG. 32 shows a highly schematic representation of the machine tool according to FIG. 30 and the height measuring device in connection with the measurement of a first workpiece.
Figure 33:
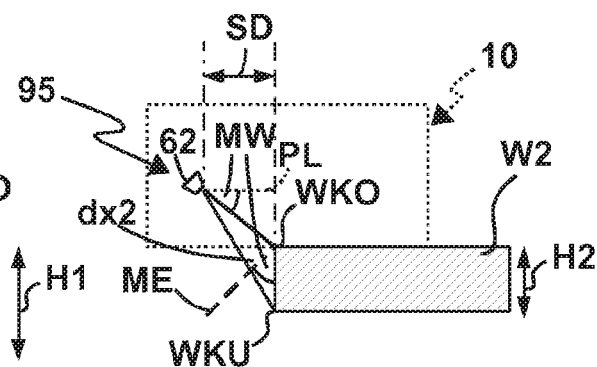
FIG. 33 shows the arrangement according to FIG. 32, but during the measurement of another, thinner workpiece.

For example, in the event of a relative adjustment of workpiece W and machine tool 10, an optical image detection means on the machine tool 10 can for example detect if the upper workpiece edge WKO or the lower workpiece edge WKU assume a reference position in relation to the tool sensor 62, for example the position illustrated in FIGS. 30, 32 and 33. An edge detection means is for example conceivable or possible for this purpose. In this moment, the height measuring device 10 also determines the position of the other workpiece edge, i.e. the upper workpiece edge WKO or the lower workpiece edge WKU, so that at the time of measurement both workpiece edges WKO and WKU are detected by the height measuring device. It is possible that the height measuring device 35 so to speak takes a snapshot of this reference situation, i.e. an image in which both workpiece edges WKU and WKO are visible if the reference position, for example the position illustrated in FIGS. 30, 32, and 33, is assumed during the relative adjustment of workpiece W and machine tool 10.

A reference light source 68 can also be used to determine a respective reference position. The reference light source 68 shines so to speak roughly parallel to the detection range of the tool sensor 62. If the machine tool 10 is still at a distance from the workpiece 10 (i.e. still moved to the left in FIG. 30) the light beam of the reference light source 68, for example a laser beam or laser pointer, is directed past the workpiece W. If the machine tool 10 is then moved forwards relative to the workpiece W, for example into the position illustrated in FIG. 30, the light from the reference light source 68 touches the lower workpiece edge WKU. The camera or the tool sensor 62 recognises the reflection on the lower workpiece edge WKU as a trigger signal, for example in order to capture the image, already explained, in which the lower workpiece edge WKU and the upper workpiece edge WKO are visible. It is also possible that in this situation the tool sensor 62 or the height measuring device 95 detects the upper workpiece edge WKO, through image recognition or other measures, in order ultimately to determine the height H of the workpiece W from the information regarding the lower workpiece edge WKU and the upper workpiece edge WKO.

Such a procedure is indicated in FIG. 38. For example, the image captured by the, viewed in the working direction, rear tool sensor 62 is illustrated in FIG. 38. For example, the machine tool 10 is moved over the workpiece W along a movement direction BR1. A light reflection LR, which is generated by a reference light which is projected onto the workpiece W by means of the reference light source 68, thereby so to speak wanders from the lower workpiece edge WKU to the upper workpiece edge WKO and wanders so to speak along a path PL. Before the reference light reaches the lower workpiece edge WKU it is virtually not reflected by the environment of the workpiece W, which the tool sensor 62 registers accordingly. If the reference light is moved over the upper workpiece edge WKO, the light reflection LR remains fixed relative for example to the work tool 15. The light reflection LR moves, on the one hand, with a movement component parallel to the movement direction BR1, but on the other hand also transversely thereto in a movement direction BR2. The height measuring device 95 can determine, for example on the basis of the assignment function illustrated in FIG. 34, the height H of the workpiece W on the basis of the distance through which the light reflection LR passes in relation to one or both of the movement directions BR1, BR2, for example the distance DR2 in the movement direction BR2.

Filters 362, 368 (FIG. 30), for example polarisation filters, colour filters or the like, can be positioned in front of the tool sensor 62 and/or the reference light source 68. Preferably, the filters 362, 368 are matched to one another, so that for example the light from the reference light source 68 is limited by the filter 368 to a predetermined colour spectrum to which, due to the filter 362, the tool sensor 62 responds particularly sensitively or exclusively. It is also possible that the filter 368, as a polarisation filter, polarises the light from the reference light source 68, i.e. allows it to pass in a predetermined orientation, and the filter 362, likewise as a correspondingly oriented polarisation filter, only allows light with the orientation corresponding to the filtering by the filter 362 to pass to the camera or to the tool sensor 62.

However, it is also advantageous if only one of the filters 362, 368 is present. For example, where the filter 362 is in the form of a polarisation filter, reflections or the like, in particular caused through the influence of extraneous light or due to the reference light source 68, can be filtered out. If the tool sensor 62 is particularly sensitive to a particular light colour, the filter 368 is for example sufficient to limit a colour spectrum of the reference light source 68 to this light colour.

A continuous determination of the workpiece height, namely in that a longitudinal distance of the tool sensor 62 and thus the height measuring device 95 from the end face WS is registered, is for example possible by means of a distance sensor 67.

The distance sensor 67 is for example a laser sensor, an ultrasonic sensor or the like.

The invention claimed is:

1. A mobile machine tool for machining a workpiece, wherein the machine tool has a guide element with a guide surface for guiding the machine tool on the workpiece or the workpiece on the machine tool, wherein the machine tool has a drive unit with a drive motor for driving a tool holder arranged on the drive unit in order to hold a work tool, wherein the machine tool has a tool sensor, a detection range of which is directed at at least a partial region of the machine tool, and wherein the machine tool has an evaluation device for evaluating a tool sensor signal generated by the tool sensor and wherein a reference marking which can be detected by the tool sensor is arranged within the detection range of the tool sensor and the evaluation device is configured to determine at least one correction value for the tool sensor signal depending on the reference marking, and wherein the reference marking comprises a pattern.

2. A mobile machine tool for machining a workpiece, wherein the machine tool has a guide element with a guide surface for guiding the machine tool on the workpiece or the workpiece on the machine tool, wherein the machine tool has a drive unit with a drive motor for driving a tool holder arranged on the drive unit in order to hold a work tool, wherein the machine tool has a tool sensor, a detection range of which is directed at at least a partial region of the machine tool, and wherein the machine tool has an evaluation device for evaluating a tool sensor signal generated by the tool sensor and wherein a reference marking which can be detected by the tool sensor is arranged within the detection range of the tool sensor and the evaluation device is configured to determine at least one correction value for the tool sensor signal depending on the reference marking, and wherein the evaluation device is configured to analyze a curvature of a straight-line section of the reference marking in order to determine the at least one correction value.

3. The mobile machine tool according to claim 1, further comprising an optical display device for displaying at least one piece of optical information generated on the basis of the tool sensor signal.

4. The mobile machine tool according to claim 1, wherein the tool sensor comprises or is formed by a camera.

5. The mobile machine tool according to claim 1, wherein the tool sensor is and/or can be calibrated intrinsically and/or extrinsically.

6. The mobile machine tool according to claim 1, wherein the evaluation device is configured to perform an extrinsic and/or intrinsic calibration of the tool sensor.

7. A mobile machine tool for machining a workpiece, wherein the machine tool has a guide element with a guide surface for guiding the machine tool on the workpiece or the workpiece on the machine tool, wherein the machine tool has a drive unit with a drive motor for driving a tool holder arranged on the drive unit in order to hold a work tool, wherein the machine tool has a tool sensor, a detection range of which is directed at at least a partial region of the machine tool, and wherein the machine tool has an evaluation device for evaluating a tool sensor signal generated by the tool sensor and wherein a reference marking which can be detected by the tool sensor is arranged within the detection range of the tool sensor and the evaluation device is configured to determine at least one correction value for the tool sensor signal depending on the reference marking, and wherein the evaluation device is configured to determine a test region within the detection range with reference to the reference marking.

8. A mobile machine tool for machining a workpiece, wherein the machine tool has a guide element with a guide surface for guiding the machine tool on the workpiece or the workpiece on the machine tool, wherein the machine tool has a drive unit with a drive motor for driving a tool holder arranged on the drive unit in order to hold a work tool, wherein the machine tool has a tool sensor, a detection range of which is directed at at least a partial region of the machine tool, and wherein the machine tool has an evaluation device for evaluating a tool sensor signal generated by the tool sensor and wherein a reference marking which can be detected by the tool sensor is arranged within the detection range of the tool sensor and the evaluation device is configured to determine at least one correction value for the tool sensor signal depending on the reference marking, and wherein the evaluation device is configured to determine a test region within the detection range with reference to a machining contour created by the work tool.

9. The mobile machine tool according to claim 8, wherein the evaluation device is provided and/or configured to determine the test region with reference to the machining contour while the work tool is removed from the workpiece.

10. The mobile machine tool according to claim 7, wherein the reference marking comprises a line or a pattern.

11. The mobile machine tool according to claim 7, wherein the reference marking is formed by at least one contour of at least one mechanically functional component of the machine tool or comprises the at least one contour.

12. The mobile machine tool according to claim 7, wherein the reference marking comprises or is formed by a control marking provided exclusively for the purpose of determining the correction value.

13. The mobile machine tool according to claim 1, wherein the tool is configured to orient an optical information generated or generatable on the basis of the tool sensor signal relative to the reference marking.

14. The mobile machine tool according to claim 1, wherein the evaluation device has a stored image of the reference marking and is configured to compare the stored image with an image of the reference marking which can be captured by the tool sensor in order to determine the correction value for the tool sensor signal.

15. A mobile machine tool for machining a workpiece, wherein the machine tool has a guide element with a guide surface for guiding the machine tool on the workpiece or the workpiece on the machine tool, wherein the machine tool has a drive unit with a drive motor for driving a tool holder arranged on the drive unit in order to hold a work tool, wherein the machine tool has a tool sensor, a detection range of which is directed at at least a partial region of the machine tool, and wherein the machine tool has an evaluation device for evaluating a tool sensor signal generated by the tool sensor and wherein a reference marking which can be detected by the tool sensor is arranged within the detection range of the tool sensor and the evaluation device is configured to determine at least one correction value for the tool sensor signal depending on the reference marking, and wherein the reference marking differs in terms of size and/or geometry and/or extent and/or colour and/or contrast from a functional component of the machine tool in the vicinity of the reference marking which does not fulfil the function of the reference marking.

16. A mobile machine tool for machining a workpiece, wherein the machine tool has a guide element with a guide surface for guiding the machine tool on the workpiece or the workpiece on the machine tool, wherein the machine tool has a drive unit with a drive motor for driving a tool holder arranged on the drive unit in order to hold a work tool, wherein the machine tool has a tool sensor, a detection range of which is directed at at least a partial region of the machine tool, and wherein the machine tool has an evaluation device for evaluating a tool sensor signal generated by the tool sensor and wherein a reference marking which can be detected by the tool sensor is arranged within the detection range of the tool sensor and the evaluation device is configured to determine at least one correction value for the tool sensor signal depending on the reference marking, and wherein the reference marking has at least one colour and/or at least one contrast which differs by a predetermined degree from a typical colour spectrum of an environment of the reference marking.

17. The mobile machine tool according to claim 1, wherein the tool is equipped to correct the tool sensor signal depending on the at least one correction value.

18. The mobile machine tool according to claim 1, wherein the tool sensor is or can be calibrated on the basis of the at least one correction value.

\* \* \* \* \*